(12) United States Patent
Jha et al.

(10) Patent No.: US 11,615,009 B2
(45) Date of Patent: Mar. 28, 2023

(54) METHOD FOR MITIGATING TEMPERATURE OF ELECTRONIC DEVICE

(71) Applicant: Samsung Electronics Co., Ltd., Suwon-si (KR)

(72) Inventors: Kailash Kumar Jha, Bangalore (IN); Nitesh Pushpak Shah, Bangalore (IN); Nishant, Bangalore (IN); Alok Kumar Jangid, Bangalore (IN); Avneesh Tiwari, Bangalore (IN); Ravi Gupta, Bangalore (IN); Srinidhi N, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 17/039,771

(22) Filed: Sep. 30, 2020

(65) Prior Publication Data

US 2021/0096973 A1   Apr. 1, 2021

(30) Foreign Application Priority Data

Oct. 1, 2019 (IN) .............................. 201941039776
Sep. 10, 2020 (IN) .............................. 201941039776

(51) Int. Cl.
  *G06F 11/30* (2006.01)
  *G06N 20/00* (2019.01)
  (Continued)

(52) U.S. Cl.
  CPC .......... *G06F 11/3058* (2013.01); *G06F 1/206* (2013.01); *G06F 11/002* (2013.01);
  (Continued)

(58) Field of Classification Search
  None
  See application file for complete search history.

(56) References Cited

U.S. PATENT DOCUMENTS

| 10,178,578 | B1* | 1/2019 | McFarland | ........... H04W 52/38 |
| 2005/0180338 | A1* | 8/2005 | Pirila | ...................... H04L 65/80 |
| | | | | 370/465 |

(Continued)

FOREIGN PATENT DOCUMENTS

WO   2018186699 A1   10/2018

OTHER PUBLICATIONS

International Search Report of the International Searching Authority in connection with International Application No. PCT/KR2020/013130 dated Jan. 5, 2021, 3 pages.

*Primary Examiner* — Isaac Tuku Tecklu

(57) ABSTRACT

Embodiments herein disclose a method for mitigating a temperature of an electronic device. The method includes determining, by the electronic device, the temperature of the electronic device, while a plurality of applications are executed on the electronic device, wherein each of the applications from the plurality of applications is associated with a first RAT. Further, the method includes detecting, by the electronic device, that the temperature of the electronic device meets thermal mitigation criteria. Further, the method includes mitigating, by the electronic device, the temperature of the electronic device by switching the application from the plurality of applications from the first RAT to a second RAT in response to detecting that the temperature of the electronic device meets the thermal mitigation criteria.

18 Claims, 24 Drawing Sheets

(51) Int. Cl.
*G06F 11/00* (2006.01)
*G06F 11/07* (2006.01)
*G06F 1/20* (2006.01)

(52) U.S. Cl.
CPC ........ *G06F 11/076* (2013.01); *G06F 11/3006* (2013.01); *G06N 20/00* (2019.01)

(56) References Cited

U.S. PATENT DOCUMENTS

| | | | | |
|---|---|---|---|---|
| 2013/0078977 | A1* | 3/2013 | Anderson | H04B 1/036 455/418 |
| 2015/0011211 | A1* | 1/2015 | Plestid | H04W 36/24 455/436 |
| 2016/0366615 | A1* | 12/2016 | Batchu | H04W 28/0242 |
| 2018/0110010 | A1* | 4/2018 | Khawand | G06F 3/0482 |
| 2018/0359672 | A1* | 12/2018 | Keller | H04W 36/0022 |
| 2019/0174336 | A1* | 6/2019 | Mcfarland | H04W 24/04 |
| 2020/0036643 | A1* | 1/2020 | Jang | G06F 9/44 |
| 2020/0387204 | A1* | 12/2020 | McFarland | H04W 52/367 |

* cited by examiner

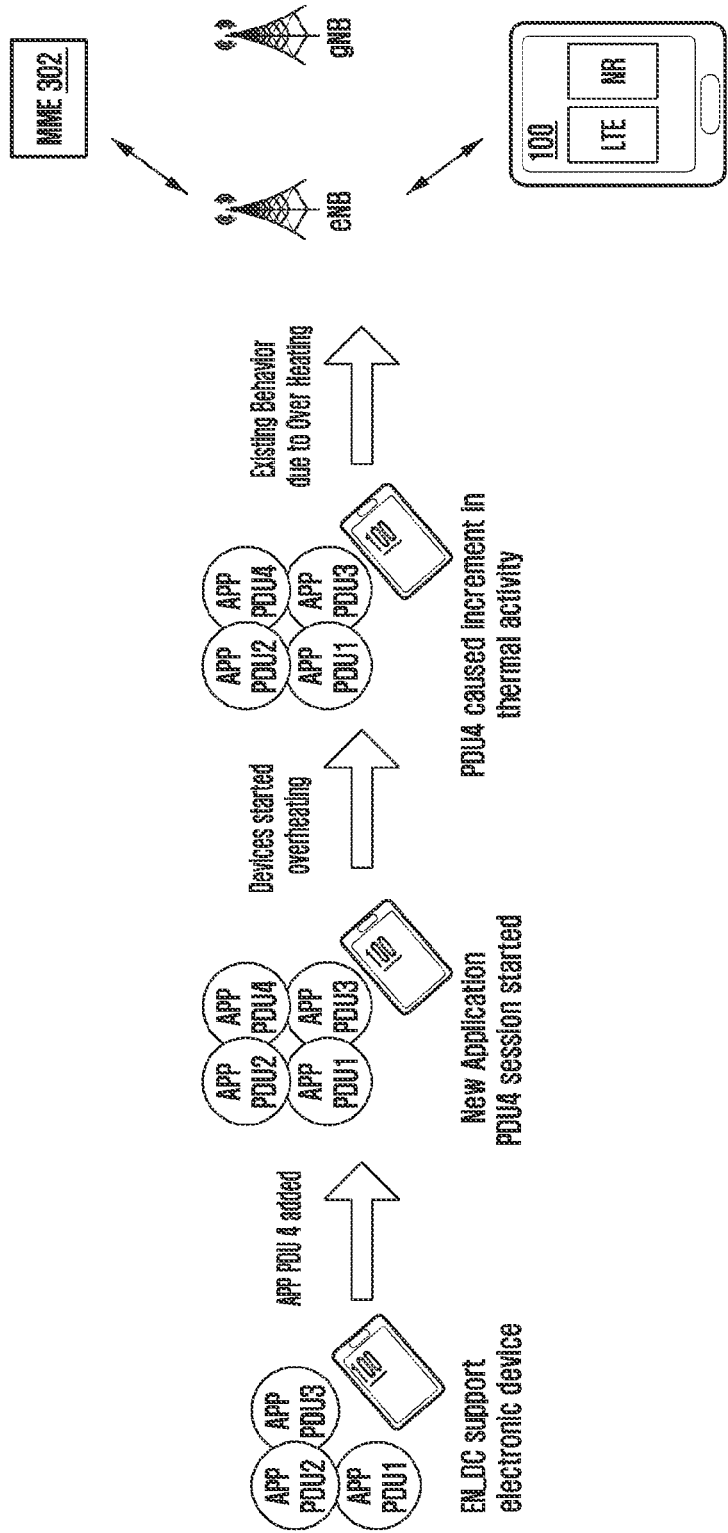

METHOD FOR MITIGATING TEMPERATURE OF ELECTRONIC DEVICE

CROSS-REFFERENCE TO RELATED APPLICATIONS

This application is based on and claims priority under 35 U.S.C. 119 to Indian Patent Provisional Application No. 201941039776 filed on Oct. 1, 2019, and Non-provisional Application No. 201941039776 filed on Sep. 10, 2020 in the Indian Patent Office, the disclosures of which are herein incorporated by reference in their entireties.

BACKGROUND

1. Field

The present disclosure relates to a temperature mitigating method for an electronic device, and more specifically related to a method and electronic device for application based thermal mitigation handling.

2. Description of Related Art

The temperature of an electronic device can increase due to heavy usage, e.g., high-speed downloads (in case of New Radio (NR)), complex computational works, etc. If the heavy usage proceeds for a long period, the heavy usage can damage the electronic device. In order to overcome this problem, the NR suspend is provided as a solution with different other proposals. Different electronic device implementations have their own proprietary power saving designs, internal configurations, and thermal management techniques. In an example, electronic device category reduction, carrier/ Multiple Input Multiple Output (MIMO) order reduction, bandwidth, and duty cycle reduction are proposed for handling the thermal mitigation in the electronic device. However, the above proposed methods can increase protocol complexity and can be used for particular instances.

In view of the above, it is desirable to address the above mentioned disadvantages or other shortcomings.

SUMMARY

The principal object of the embodiments herein is to provide a method and system for application based thermal mitigation handling by automatically switching an application from a plurality of applications from a first RAT to a second RAT when a temperature of the electronic device meets a thermal mitigation criteria, so as retain a service (e.g., voice call, voice over NR (VoNR) call, or the like) without any intervention. This results in increasing a user experience.

Another object of the embodiment herein is to move overheat causing application to a Long-Term Evolution (LTE) stack from a NR stack and throttle overheat causing application's downlink speed.

Accordingly, embodiments herein disclose a method for mitigating a temperature of an electronic device. The method includes determining, by the electronic device, the temperature of the electronic device, while a plurality of applications are executed on the electronic device, wherein each of the applications from the plurality of applications is associated with a first radio access technology (RAT). Further, the method includes detecting, by the electronic device, that the temperature of the electronic device meets thermal mitigation criteria. Further, the method includes mitigating, by the electronic device, the temperature of the electronic device by switching the application from the plurality of applications from the first RAT to a second RAT in response to detecting that the temperature of the electronic device meets the thermal mitigation criteria.

In an embodiment, the application is automatically switched from the plurality of applications from the first RAT to the second RAT.

In an embodiment, the application is manually switched from the plurality of applications from the first RAT to the second RAT using a feature provided on the electronic device. The feature is configured by the OEM, a service provider or user of the electronic device.

In an embodiment, the first RAT is a New Radio (NR) RAT, the second RAT is a Long Term Evolution (LTE) RAT, and the electronic device is operating in a dual registration mode.

In an embodiment, the application is dynamically selected by determining, by the electronic device, a plurality of parameters associated with each of the applications from the plurality of the application, wherein a parameter from the plurality of parameters contributes to raise the temperature of the electronic device, determining, by the electronic device, a temperature contribution level of each of the applications for raising the temperature of the electronic device by applying a machine learning model on the plurality of parameters associated with each of the applications, and dynamically selecting, by the electronic device, the application due to which the temperature level exceeds a temperature threshold.

In an embodiment, automatically switching, by the electronic device, the application from the plurality of applications to the second RAT from the first RAT includes sending, by the electronic device, a data connection request corresponding to the application to a network entity associated with the second RAT, receiving, by the electronic device, a data connection response corresponding to the application from the network entity associated with the second RAT based on the data connection request, and automatically switching, by the electronic device, the application to the second RAT from the first RAT by establishing a connection with the second RAT.

In an embodiment, automatically switching, by the electronic device, the application from the plurality of applications to the second RAT from the first RAT includes sending, by the electronic device, an non-access stratum message request (e.g., attach request, tracking area update request, PDN connectivity request with handover) corresponding to the application to a network entity associated with the second RAT, when the electronic device searches the network entity associated with the second RAT, receiving, by the electronic device, an non-access stratum message response (e.g., attach accept response, tracking area update response, PDN connectivity response with handover) corresponding to the application from the network entity associated with the second RAT based on the non-access stratum message request, and automatically switching, by the electronic device, a data connection of the application to the second RAT from the first RAT based on the attach accept response.

In an embodiment, the parameter is a rate-controlled socket parameter, an incoming buffer information, a number of Transmission Control Protocol (TCP) connection, a maximum number of concurrent connections to a server, an application throughput information, an application device heating capacity information, a radio frequency (RF) utilization information, an application priority information, an quality of service information, a TCP level scheduling information, and a processor usage associated with the application.

In an embodiment, the method further includes detecting, by the electronic device, that the temperature of the electronic device is within the thermal mitigation criteria. Further, the method includes automatically switching, by the electronic device, the application from the plurality of applications to the first RAT from the second RAT in response to detecting that the temperature of the electronic device is within the thermal mitigation criteria.

In an embodiment, the method further includes controlling a throughput of the electronic device in response to mitigating the temperature of the electronic device.

In an embodiment, the temperature of the electronic device is determined during one of a EUTRA NR Dual Connectivity (ENDC) mode or a standalone mode (SA) mode.

In an embodiment, the machine learning model is trained by a monitoring operation of each application of the plurality of applications on the electronic device over a period of time, monitoring the plurality of parameters associated with each application of the plurality of applications, identifying a temperature contribution level of each of the applications for raising the temperature of the electronic device, and storing the plurality of parameters associated with each application of the plurality of applications associated with the temperature contribution level.

In another embodiment, the machine learning model is trained by a monitoring a set of applications from the plurality of applications operating simultaneously on the electronic device, monitoring the plurality of parameters associated with the set of applications from the plurality of applications operating simultaneously on the electronic device, identifying the temperature contribution level of set of applications for raising the temperature of the electronic device, and storing the plurality of parameters associated with the set of applications of the plurality of applications associated with the temperature contribution level.

In an embodiment, the first RAT corresponds to a Voice over New Radio (VoNR) and the second RAT corresponds to a Voice over Long Term Evolution (VoLTE).

In an embodiment, the first RAT corresponds to a Voice over New Radio (VoNR) and the second RAT corresponds to a Voice over wireless fidelity (VoWi-Fi).

In an embodiment, the application is a video call application, a voice call application, a game application, a media streaming application, a fitness application, a social networking application, a multimedia application, a financial application, a chat application, or a music application.

In an embodiment, when the application is a voice call application and the voice call is in the VoNR, switching, by the electronic device, the voice call application to the VoWi-Fi from the VoNR includes sending, by the electronic device, a data connection request corresponding to the voice call application to a network entity associated with the VoWi-Fi, receiving, by the electronic device, a data connection response corresponding to the voice call application from the network entity associated with the VoWi-Fi based on the data connection request, and switching, by the electronic device, the voice call application to the VoWi-Fi from the VoNR by establishing a connection with the VoWi-Fi.

In an embodiment, when the application is a voice call application and the voice call is in the VoNR, switching, by the electronic device, the voice call application to the VoLTE from the VoNR includes sending, by the electronic device, a non-access stratum message corresponding to the voice application to a network entity associated with the VoLTE, when the electronic device searches the network entity associated with the VoLTE, receiving, by the electronic device, a non-access stratum message response corresponding to the voice call application from the network entity associated with the VoLTE based on the non-access stratum message, and switching, by the electronic device, a data connection of the voice call application to the VoLTE from the VoNR based on the attach accept response.

In an embodiment, when the application is a video call application and the video call is in the VoNR, switching, by the electronic device, the video call application to the VoWi-Fi from the VoNR includes sending, by the electronic device, a data connection request corresponding to the video call application to a network entity associated with the VoWi-Fi, receiving, by the electronic device, a data connection response corresponding to the video call application from the network entity associated with the VoWi-Fi based on the data connection request, and switching, by the electronic device, the video call application to the VoWi-Fi from the VoNR by establishing a connection with the VoWi-Fi.

In an embodiment, when the application is a video call application and the video call is in the VoNR, switching, by the electronic device, the video call application to the VoLTE from the VoNR includes sending, by the electronic device, a non-access stratum message corresponding to the video application to a network entity associated with the VoLTE, when the electronic device searches the network entity associated with the VoLTE, receiving, by the electronic device, a non-access stratum message response corresponding to the video call application from the network entity associated with the VoLTE based on the non-access stratum message, and switching, by the electronic device, a data connection of the video call application to the VoLTE from the VoNR based on the attach accept response.

In an embodiment, when the application is a video call application and the video call is in the VoNR, switch the video call application to a voice call application in the in the VoNR includes detect a temperature contribution level of the video call application for raising the temperature of the electronic device, and switch the video call application to the voice call application in the VoNR based on the detection.

Accordingly, embodiments herein discloses an electronic device for mitigating a temperature of the electronic device. The electronic device includes a processor coupled with a memory. The processor is configured to determine the temperature of the electronic device, while a plurality of applications are executed on the electronic device, where each of the applications from the plurality of applications is associated with a first RAT. Further, the processor is configured to detect that the temperature of the electronic device meets thermal mitigation criteria. Further, the processor is configured to mitigate the temperature of the electronic device by automatically switching the application from the plurality of applications from the first RAT to a second RAT in response to detecting that the temperature of the electronic device meets the thermal mitigation criteria.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The method and electronic device are illustrated in the accompanying drawings, throughout which like reference letters indicate corresponding parts in the various figures. The embodiments herein will be better understood from the following description with reference to the drawings, in which:

FIG. 3 illustrates an example scenario in which the electronic device measures are taken for overheat causing applications before/after start of over-heating, when the electronic device is in a EN-DC mode, according to a prior art;

DETAILED DESCRIPTION

Figure 1:
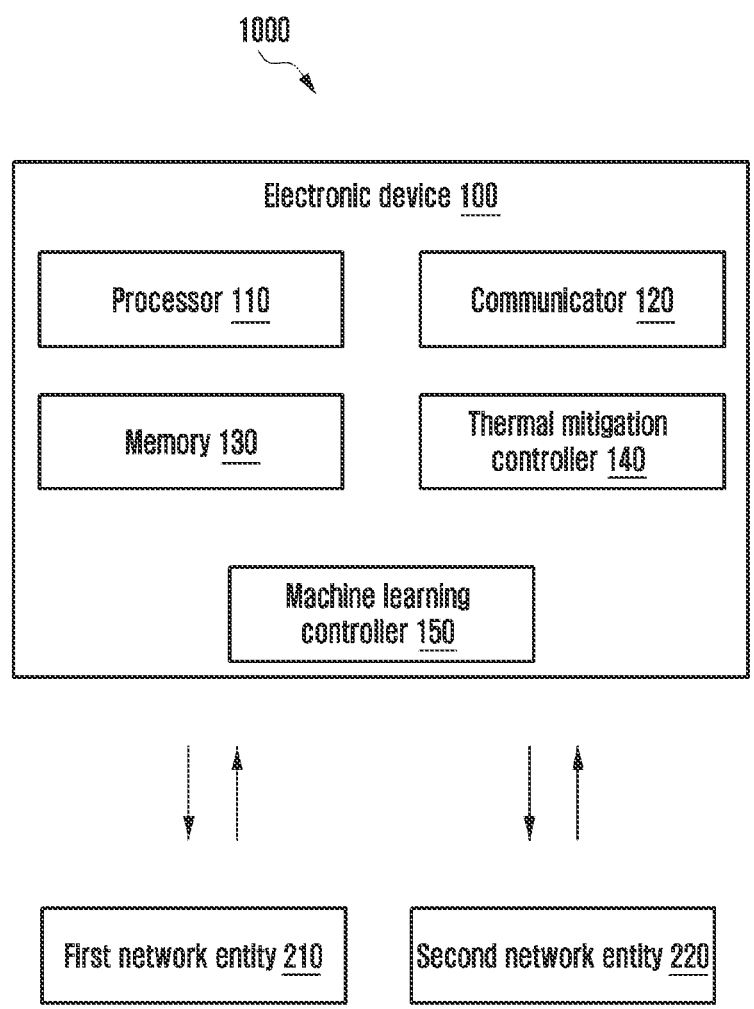
FIG. 1 illustrates an overview of a system in which an electronic device for mitigating a temperature of the electronic device, according to an embodiment as disclosed herein.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of this disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for mitigating a temperature of an electronic device. The method includes determining, by the electronic device, the temperature of the electronic device, while a plurality of applications are executed on the electronic device, wherein each of the applications from the plurality of applications is associated with a first radio access technology (RAT). Further, the method includes detecting, by the electronic device, that the temperature of the electronic device meets thermal mitigation criteria. Further, the method includes mitigating, by the electronic device, the temperature of the electronic device by automatically switching the application from the plurality of applications from the first RAT to a second RAT in response to detecting that the temperature of the electronic device meets the thermal mitigation criteria.

The proposed method can be used for handling the application based thermal mitigation by automatically switching an application from a plurality of applications from a first RAT to a second RAT when a temperature of the electronic device meets a thermal mitigation criteria, so as retain a service (e.g., voice call, VoNR call, or the like) without any intervention. This results in increasing the user experience.

Referring now to the drawings, and more particularly to FIGS. 1, 2, 4, 6, 8, 9, 12-16, 18-21, and 23, where similar reference characters denote corresponding features consistently throughout the figures, there are shown preferred embodiments.

FIG. 1 illustrates an overview of a system (1000) of an electronic device (100) for mitigating a temperature of the electronic device (100), according to an embodiment as disclosed herein. The system (1000) includes the electronic device (100), a first network entity (210) and a second network entity (220). The first network entity (210) can be a Next Generation Core (NGC). The second network entity (220) can be an Evolved Packet Core (EPC), mobility management entity (MME) or any other legacy entity. The electronic device (100) can be, for example, but not limited to a cellular phone, a smart phone, a Personal Digital Assistant (PDA), a tablet computer, a laptop computer, an Internet of Things (IoT), a virtual reality device and an immersive system. The electronic device (100) includes a processor (110), a communicator (120), a memory (130), a thermal mitigation controller (140), and a machine learning controller (150). The processor (110) is coupled with the communicator (120), the memory (130), the thermal mitigation controller (140), and the machine learning controller (150).

The thermal mitigation controller (140) configured to determine the temperature of the electronic device (100), while a plurality of applications are executed on the electronic device (100), wherein each of the applications from the plurality of applications is associated with a first RAT. The application may be, for example, but not limited to a video call application, a game application, a health related application, a sports application, a media streaming application, a financial application, or a music application. The temperature of the electronic device (100) is determined during ENDC mode or a SA mode.

Further, the thermal mitigation controller (140) is configured to detect that the temperature of the electronic device (100) meets thermal mitigation criteria. The thermal mitigation criteria is defined by at least one of a service provider, a user of the electronic device (100) and an original equipment manufacturer (OEM). After detecting that the temperature of the electronic device (100) meets the thermal mitigation criteria, the thermal mitigation controller (140) is configured to mitigate the temperature of the electronic device (100) by switching the application from the plurality of applications from the first RAT to a second RAT. In an embodiment, the first RAT is a NR RAT, the second RAT is a LTE RAT and the electronic device is operating in a dual registration mode. In another embodiment, the first RAT is a sixth generation (6G) RAT and the second RAT is the NR RAT. In another embodiment, the first RAT is an O-RAN RAT and the second RAT is the NR RAT. In another embodiment, the first RAT is a 5G or above 5G network and the second RAT is a legacy network.

In an embodiment, the application is automatically switched from the plurality of applications from the first RAT to the second RAT. In another embodiment, the application is manually switched from the plurality of applications from the first RAT to the second RAT using a feature provided in the electronic device (100). The feature is configured by the OEM, a service provider or user of the electronic device (100).

The application is dynamically selected by determining a plurality of parameters associated with each of the applications from the plurality of the application, determining a temperature contribution level of each of the applications for raising the temperature of the electronic device (100) by applying a machine learning model on the plurality of parameters associated with each of the applications using the machine learning controller (150), and dynamically selecting the application for which the temperature contribution level exceeds a temperature threshold. The one or more parameter contribute to raising the temperature of the electronic device (100). The parameter may be, for example, but not limited to, a rate-controlled socket parameter, an incoming buffer information, a numbers of TCP connection, a maximum number of concurrent connections to a server, an application throughput information, an application device heating capacity information, a RF utilization information, an application priority information, an quality of service information, a TCP level scheduling information, and a processor usage associated with the application.

In an embodiment, the machine learning model may be trained by a monitoring operation of each application of the plurality of applications on the electronic device (100) over a period of time, monitoring the plurality of parameters associated with each application of the plurality of applications, identifying a temperature contribution level of each of the applications for raising the temperature of the electronic device (100), and storing the plurality of parameters associated with each application of the plurality of applications associated with the temperature contribution level.

In another embodiment, the machine learning model may be trained by a monitoring a set of applications from the plurality of applications operating simultaneously on the electronic device (100), monitoring the plurality of parameters associated with the set of applications from the plurality of applications operating simultaneously on the electronic device (100), identifying the temperature contribution level of set of applications for raising the temperature of the electronic device (100), and storing the plurality of parameters associated with the set of applications of the plurality of applications associated with the temperature contribution level.

In an embodiment, the application from the plurality of applications is automatically switched to the second RAT from the first RAT by sending a data connection request corresponding to the application to a second network entity (220) associated with the second RAT, receiving a data connection response corresponding to the application from the second network entity (220) associated with the second RAT based on the data connection request, and automatically switching the application to the second RAT from the first RAT by establishing a connection with the second RAT. The detailed explanation for the application automatically switched to the second RAT from the first RAT is provided in FIG. 9.

In another embodiment, the application is automatically switched to the second RAT from the first RAT by sending an attach request corresponding to the application to the second network entity (220) associated with the second RAT, when the electronic device (100) searches the network entity associated with the second RAT, receiving an attach accept response corresponding to the application from the second network entity (220) associated with the second RAT based on the attach request, and automatically switching the data connection of the application to the second RAT from the first RAT based on the attach accept response. The detailed explanation for the application automatically switched to the second RAT from the first RAT is provided in FIG. 19.

Further, the thermal mitigation controller (140) is configured to detect that the temperature of the electronic device (100) is within the thermal mitigation criteria. Based on detecting that the temperature of the electronic device (100) is within the thermal mitigation criteria, the thermal mitigation controller (140) is configured to automatically switch the application from the plurality of applications to the first RAT from the second RAT.

After mitigating the temperature of the electronic device (100), the thermal mitigation controller (140) is configured to control a throughput of the electronic device (100).

The processor (110) is configured to execute instructions stored in the memory (130) and to perform various processes. The communicator (120) is configured for communicating internally between internal hardware components and/or external devices via one or more networks or the server.

Further, the memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, a plurality of modules may be implemented through an AI model. A function associated with AI may be performed through the non-volatile memory, the volatile memory, and the processor. The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying learning techniques to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

In an example, consider two applications' PDUs are in a data session in a 5G network and the temperature of the electronic device (100) is well within a threshold limit. At some point of time later, one more application PDU data sessions is started on the 5G network. Due to the third one, the temperature starts increasing and crosses the threshold limit. In this scenario, the thermal mitigation based on a proposed method will start. The third application PDU will be moved to LTE stack to reduce the temperature caused by extensive data sessions in the 5G network. The movement of PDUs will be gradual. That means to first move the PDU3 to a LTE stack. If movement of PDU3 does not reduce the temperature according to required parameters, move PDU2 to the LTE stack along with PDU3. This will help in achieving thermal mitigation optimally, without much compromise on the quality of service. Various examples for mitigating the temperature of the electronic device (100) is explained in FIG. 4, FIG. 6, FIG. 8, FIG. 9, FIGS. 12-16, FIGS. 18-21, and FIG. 23.

Although FIG. 1 illustrates various hardware components of the electronic device (100) but it is to be understood that other embodiments are not limited thereon. In other embodiments, the electronic device (100) may include less or more number of components. Further, the labels or names of the components are used only for illustrative purpose and do not limit the scope of this disclosure. One or more components can be combined together to perform the same or substantially similar function to mitigate the temperature of the electronic device (100).

Figure 2A:
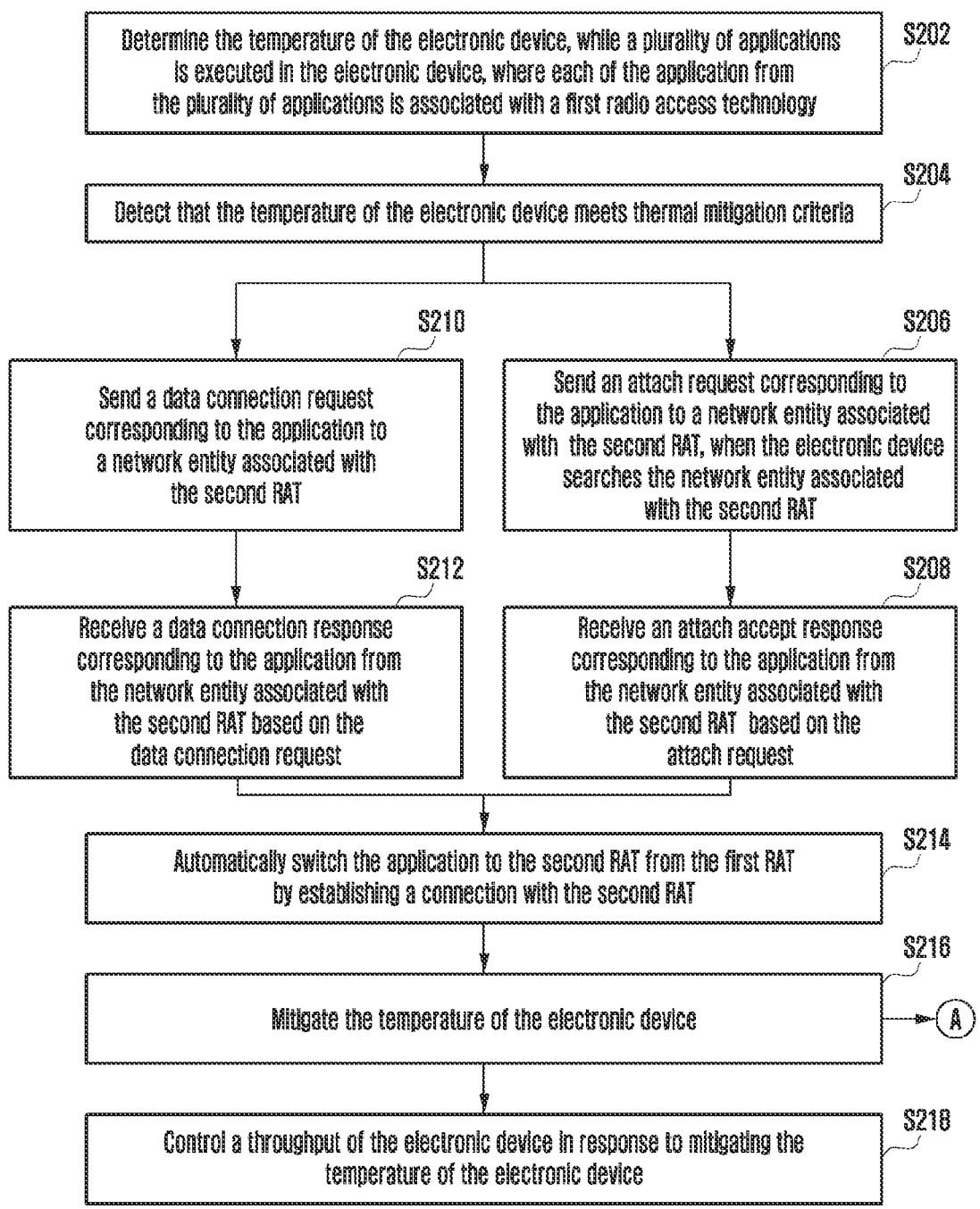
FIGS. 2A and 2B illustrate a flow chart illustrating a method for mitigating a temperature of the electronic device, according to an embodiment as disclosed herein.
Figure 2B:
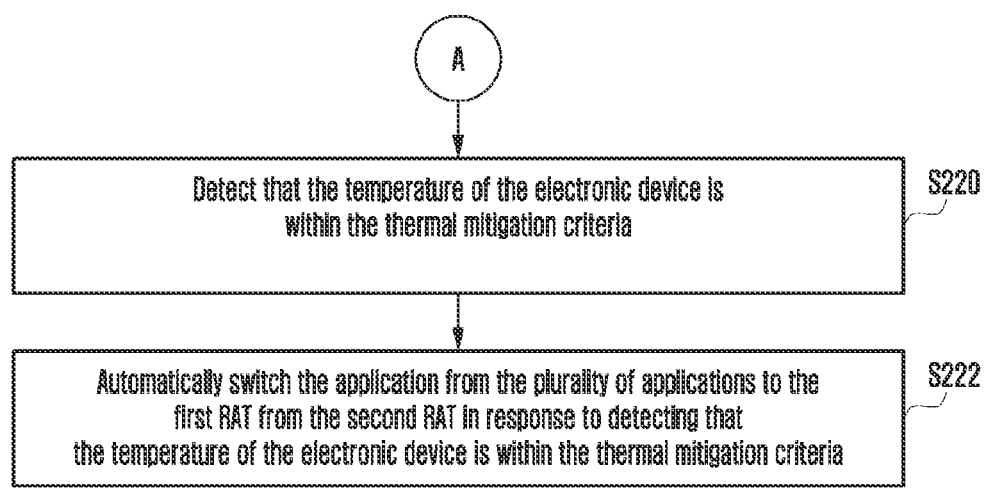

FIGS. 2A and 2B illustrate a flow chart (S202) illustrating a method for mitigating the temperature of the electronic device (100), according to an embodiment as disclosed herein. The operations (S202-S222) are performed by the thermal mitigation controller (140).

At S202, the method includes determining the temperature of the electronic device (100), while the plurality of applications are executed on the electronic device (100), where each of the applications from the plurality of applications is associated with the first RAT. At S204, the method includes detecting that the temperature of the electronic device (100) meets the thermal mitigation criteria.

At S206, the method includes sending the attach request corresponding to the application to the second network entity (220) associated with the second RAT, when the electronic device (100) searches the second network entity (220) associated with the second RAT. At S208, the method includes receiving the attach accept response corresponding to the application from the second network entity (220) associated with the second RAT based on the attach request.

At S210, the method includes sending the data connection request corresponding to the application to the second network entity (220) associated with the second RAT. At S212, the method includes receiving the data connection response corresponding to the application from the second network entity (220) associated with the second RAT based on the data connection request. At S214, the method includes automatically switching the application to the second RAT from the first RAT by establishing the connection with the second RAT. At S216, the method includes mitigating the temperature of the electronic device (100). At S218, the method includes controlling the throughput of the electronic device (100) in response to mitigating the temperature of the electronic device (100). At S220, the method includes detecting that the temperature of the electronic device (100) is within the thermal mitigation criteria. At S222, the method includes automatically switching the application from the plurality of applications to the first RAT from the second RAT in response to detecting that the temperature of the electronic device (100) is within the thermal mitigation criteria The various actions, acts, blocks, steps, or like in the flow diagram (S200) may be performed in the order presented, in a different order or simultaneously. Further, in some embodiments, some of the actions, acts, blocks, steps, or the like may be omitted, added, modified, skipped, or the like without departing from the scope of this disclosure.

FIG. 3 illustrates an example scenario in which the electronic device (100) measures are taken for the overheat causing applications after start of over-heating, when the electronic device (100) is the EN-DC mode, according to a prior art. Consider, the electronic device (100) may be an EN-DC support electronic device (100) and three PDU sessions corresponding to the three applications are already running on the electronic device (100) over the NR RAT. Now, a fourth PDU session corresponding to a new application is started on the electronic device (100) over the NR RAT. The fourth PDU session increases a thermal activity in the electronic device (100). Based on the existing methods, the electronic device (100) stop services of NR. This results in affecting the user experience.

Figure 4:
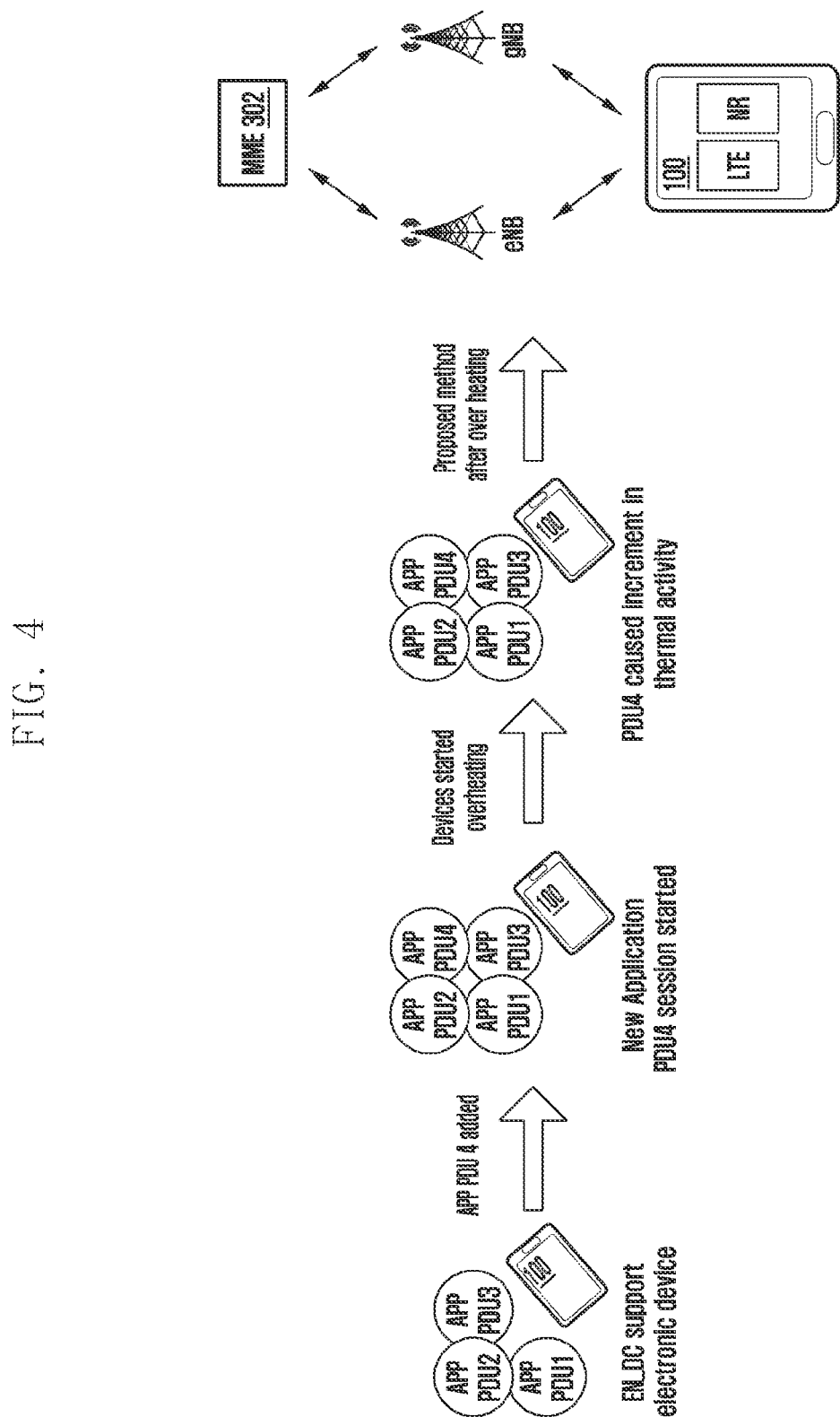
FIG. 4 illustrates an example scenario in which the electronic device measures are taken for overheat causing applications before/after start of over-heating, when the electronic device is in the EN-DC mode, according to an embodiment as disclosed herein.

FIG. 4 illustrates an example scenario in which the electronic device (100) measures taken for overheat causing applications after start of over-heating, when the electronic device (100) is the EN-DC mode, according to an embodiment as disclosed herein. Consider, the electronic device (100) is the EN-DC support electronic device and three PDU sessions corresponding to the three applications are already running on the electronic device (100) over the NR RAT. Now, a fourth PDU session corresponding to a new application is started on the electronic device over the NR RAT. The fourth PDU session increases a thermal activity in the electronic device (100). Based on the proposed method, the electronic device (100) automatically switches the fourth application from the NR RAT to a LTE RAT, so as to mitigate the temperature of the electronic device (100). This results in increasing the user experience.

In another example, based on the proposed method, the electronic device (100) automatically determines that the fourth application contributes to raise the temperature of the electronic device (100) using the machine learning controller (150). Further, the electronic device (100) automatically switches the fourth application from the NR RAT to the LTE RAT, so as to mitigate the temperature of the electronic device (100). This results in increasing the user experience.

Figure 5:
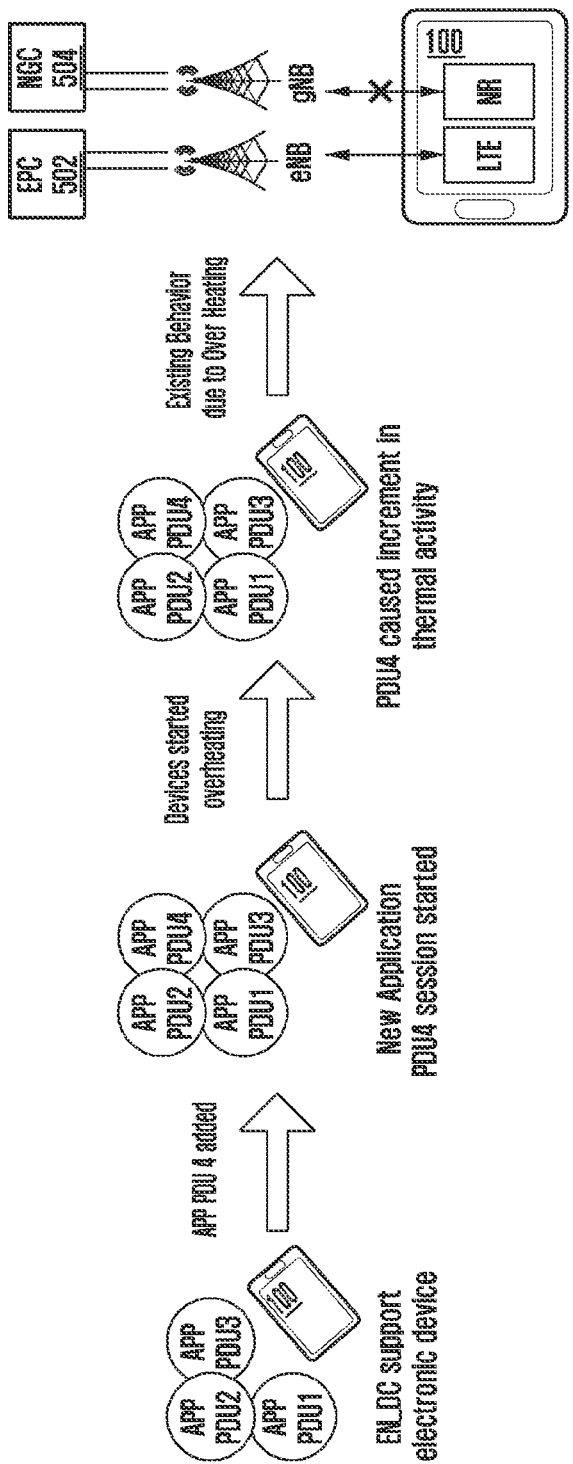
FIG. 5 illustrates an example scenario in which the electronic device measures are taken for the overheating causing application before/after start of over-heating in the electronic device when the electronic device is in a SA mode, according to a prior art.

FIG. 5 illustrates an example scenario in which the electronic device (100) measures taken for the overheating causing application before/after start of over-heating in the electronic device (100), when the electronic device (100) is the SA mode, according to a prior art. Consider, the electronic device (100) is an SA support electronic device and three PDU sessions corresponding to the three applications are already running on the electronic device (100) over the NR RAT. Now, a fourth PDU session corresponding to a new application is started on the electronic device (100) over the NR RAT. The fourth PDU session increases the thermal activity in the electronic device (100). Based on the existing methods, the electronic device (100) stop services of NR.

Figure 6:
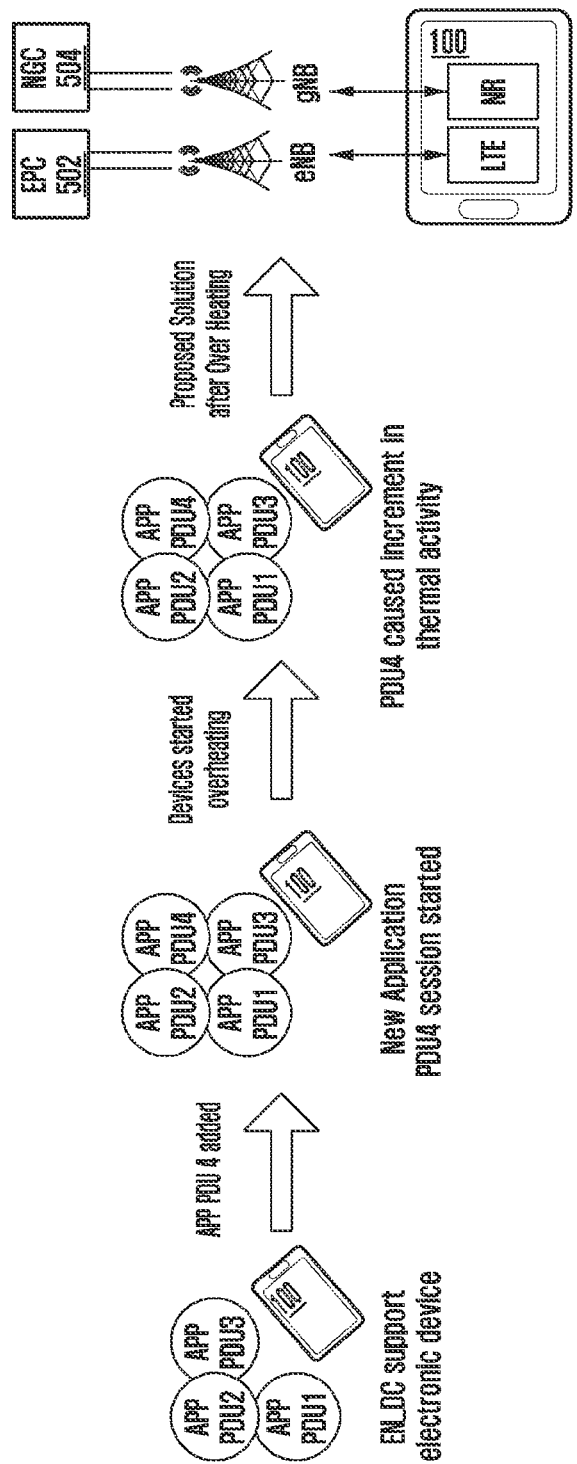
FIG. 6 illustrates an example scenario in which the electronic device measures are taken for the overheating causing applications before/after start of over-heating in the electronic device, when the electronic device is in the SA mode, according to an embodiment as disclosed herein.

FIG. 6 illustrates an example scenario in which the electronic device (100) measures taken for the overheating causing applications before/after start of over-heating in the electronic device (100), when the electronic device (100) is the SA mode, according to an embodiment as disclosed herein. Consider, the electronic device (100) is an SA support electronic device and three PDU sessions corresponding to the three applications are already running on the electronic device (100) over the NR RAT. Now, the fourth PDU session corresponding to the new application is started on the electronic device (100) over the NR RAT. The fourth PDU session increases the thermal activity in the electronic device (100). Based on the proposed method, the electronic device (100) automatically switches the fourth application from the NR RAT to the LTE RAT, so as to mitigate the temperature of the electronic device (100). Further, the electronic device (100) controls the throughput of the heat causing application by moving the fourth PDU session from the NR RAT to the LTE RAT.

In another example, based on the proposed method, the electronic device (100) automatically determines that the fourth application contributes to raise the temperature of the electronic device (100) using the machine learning controller (150). Further, the electronic device (100) automatically switches the fourth application from the NR RAT to the LTE RAT, so as to mitigate the temperature of the electronic device (100).

Figure 7:
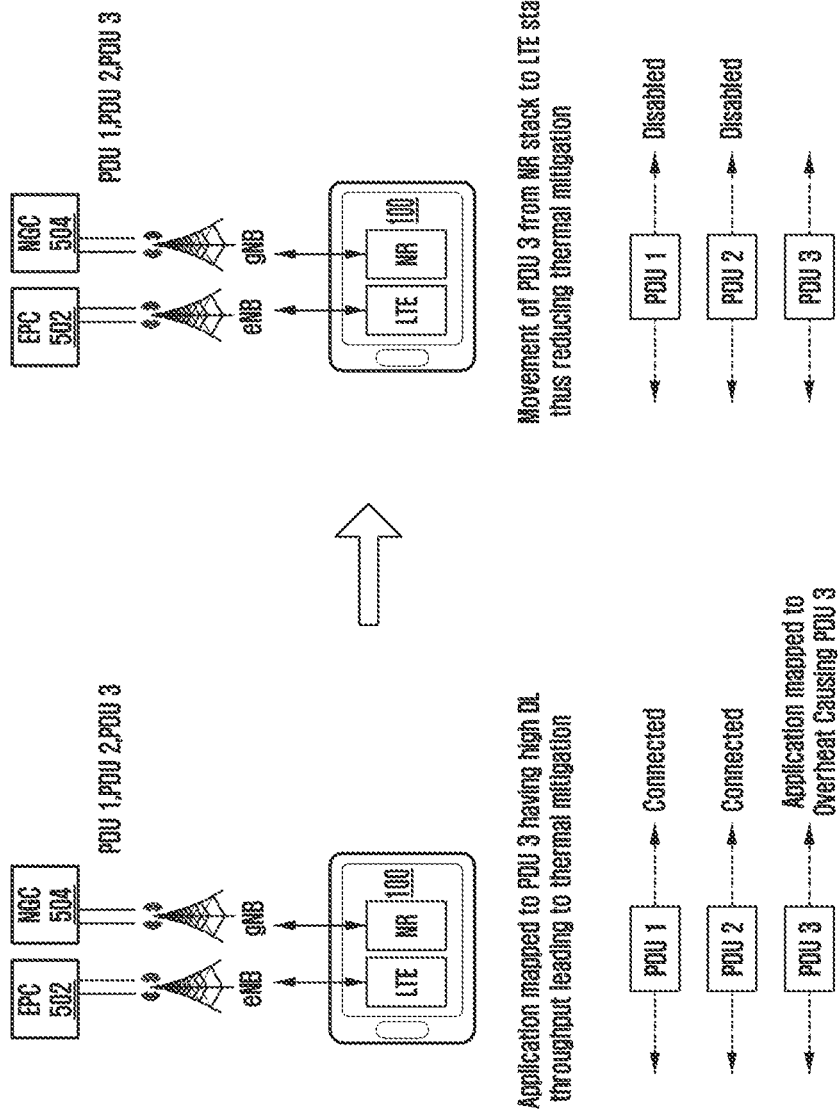
FIG. 7 illustrates an example scenario in which the application mapped to a protocol data unit (PDU) having a high throughput causing the NR suspend is depicted, according to a prior art.

FIG. 7 illustrates an example scenario in which the application mapped to the PDU having a high throughput causing the NR suspend is depicted, according to a prior art. Consider, the electronic device (100) is the SA support electronic device and three PDU session corresponding to the three application are already running on the electronic device (100) over the NR RAT in which the application mapped to the third PDU having high DL throughput leading to thermal mitigation leading to overheating and due to that NR suspend happens and the user will not be able to use the NR services.

Figure 8:
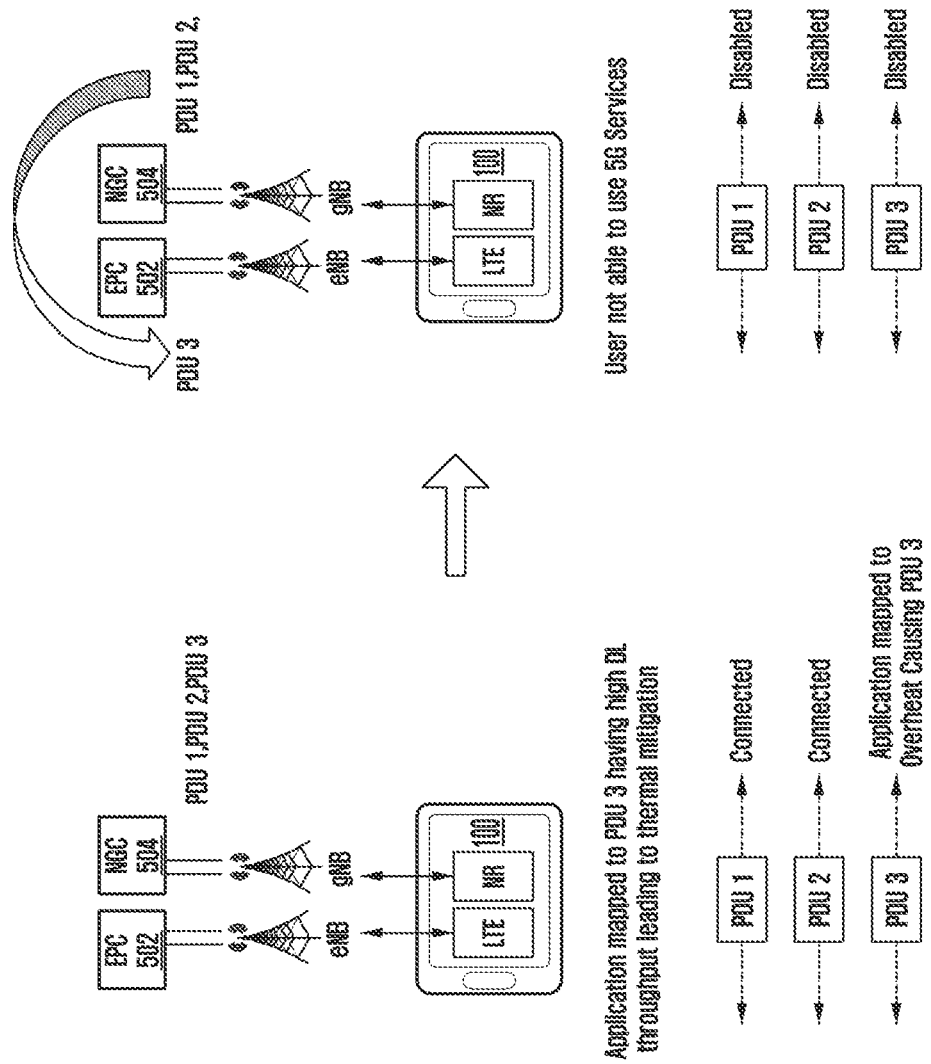
FIG. 8 illustrates an example scenario in which switching of the PDU mapped to heat causing application, on a LTE stack, is depicted, according to an embodiment as disclosed herein.

FIG. 8 illustrates an example scenario in which the switching of the PDU mapped to heat causing application, on LTE stack is depicted, according to an embodiment as disclosed herein. Consider, the electronic device (100) is the dual-registration support electronic device and three PDU sessions corresponding to the three applications are running on the electronic device (100) over the NR RAT in which the application mapped to the third PDU having high DL throughput leading to thermal mitigation. Based on the proposed methods, Throughput may be reduced, by moving the causing application to the LTE stack from the NR stack in the dual-registration mode. After the temperature reaches to an optimum level, throughput may be regained by undoing the same.

Figure 9:
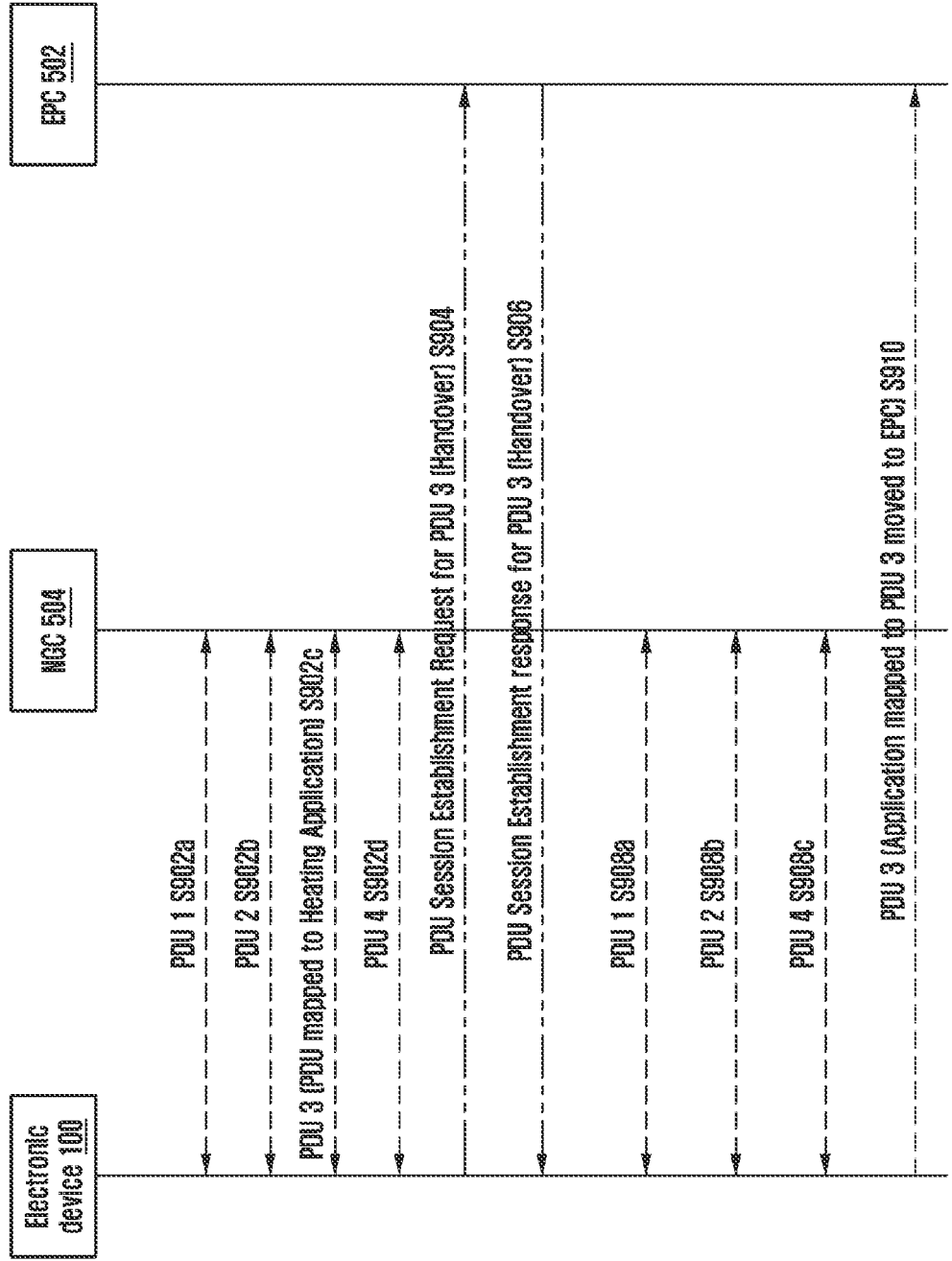
FIG. 9 illustrates an example sequence diagram illustrating switching of the PDU mapped to heat causing application on the LTE stack, according to an embodiment as disclosed herein.

FIG. 9 illustrates an example sequence diagram illustrating switching of the PDU mapped to heat causing application on the LTE stack, according to an embodiment as disclosed herein. At 902a-902d, the four PDU sessions (i.e., PDU1-PDU4) are ongoing between the electronic device (100) and a next generation core (NGC) (504). Consider, the third PDU is mapped to the heat generating application then, at S904, the electronic device (100) sends the PDU session establishment request for the third PDU 3 to the EPC 502. At S906, the electronic device (100) receives the PDU session establishment response for the PDU 3 from the EPC (502) based on the PDU session establishment request. At 908a-908c, the three PDU sessions (i.e., first PDU session, second PDU session, and the forth PDU session) are ongoing between the electronic device (100) and the NGC (504). At S910, the third PDU session is mapped to the EPC (502).

Figure 10:
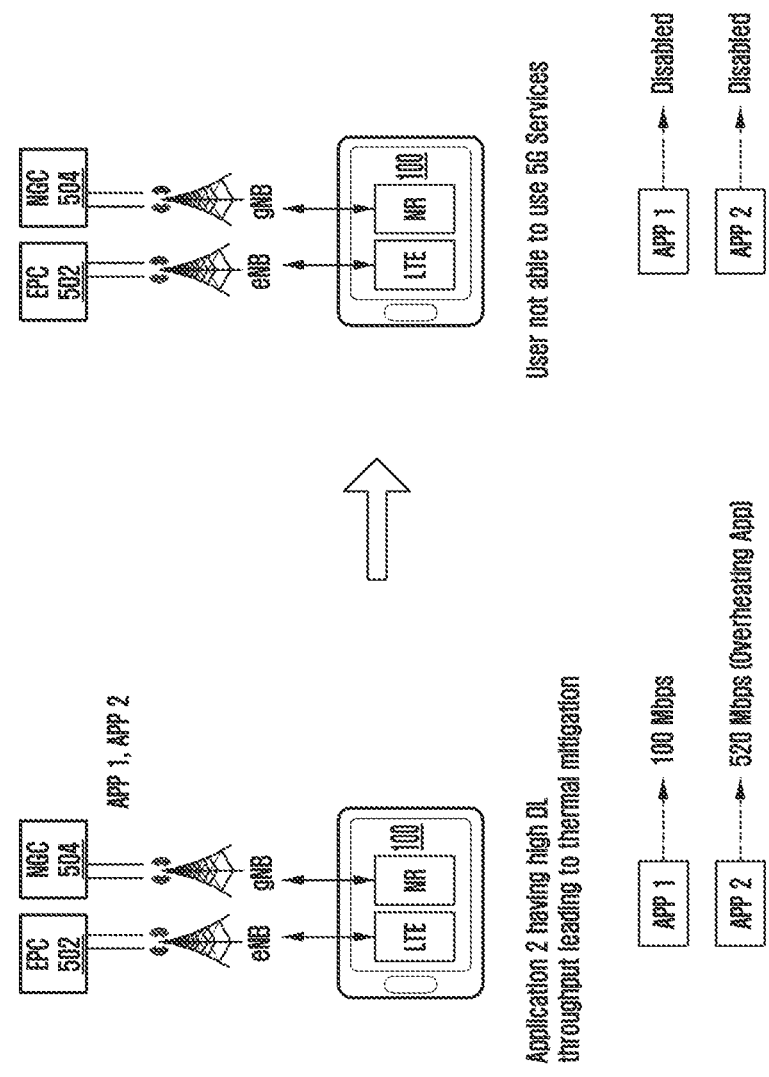
FIG. 10 illustrates an example scenario in which the application having a high downlink (DL) throughput causing NR suspend, according to a prior art.

FIG. 10 illustrates an example scenario in which the application having the high DL throughput causing NR suspend is depicted, according to a prior art. Consider, the electronic device (100) is the SA support electronic device and two PDU session corresponding to the two applications are already running on the electronic device (100) over the NR RAT in which the application mapped to the second PDU having high DL throughput leading to thermal mitigation leading to overheating and due to that NR suspend happens and the user will not be able to use the NR services.

Figure 11:
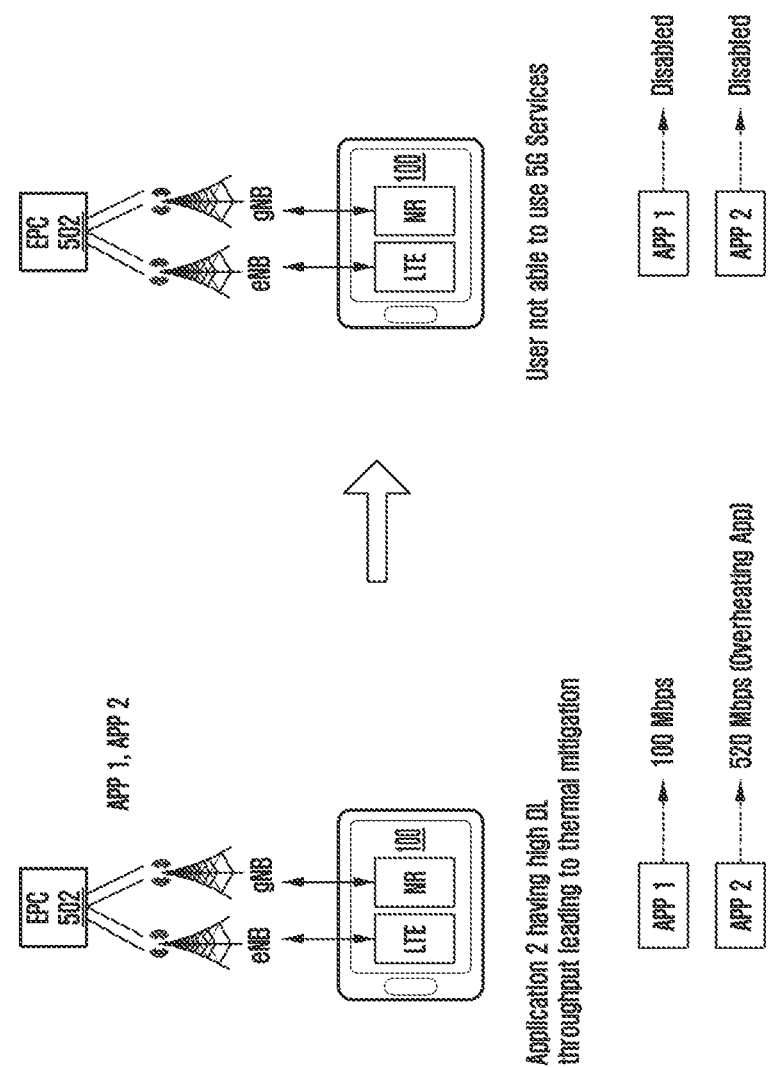
FIG. 11 illustrates an example scenario in which the application having the high DL throughput causing NR suspend, according to a prior art.

FIG. 11 illustrates an example scenario in which the application having the high DL throughput causing NR suspend is depicted, according to a prior art. Consider, the electronic device (100) is the EN-DC support electronic device and two PDU session corresponding to the two applications are already running on the electronic device (100) over the NR RAT in which the application mapped to the second PDU having high DL throughput leading to thermal mitigation leading to overheating and due to that NR suspend happens and the user will not be able to use the NR services.

In another example, the electronic device (100) will have static data of throughput on which the thermal mitigation usually starts. The electronic device (100) will update its throughput parameter based on previous thermal mitigation history. Once combined throughput of all the application PDUs crosses the thermal mitigation threshold limit, the electronic device (100) will throttle the speed of the application PDUs so that the throughput reduces to the limit. The throttling of throughput will be performed gradually to achieve proper thermal mitigation without impacting quality of service much.

Figure 12:
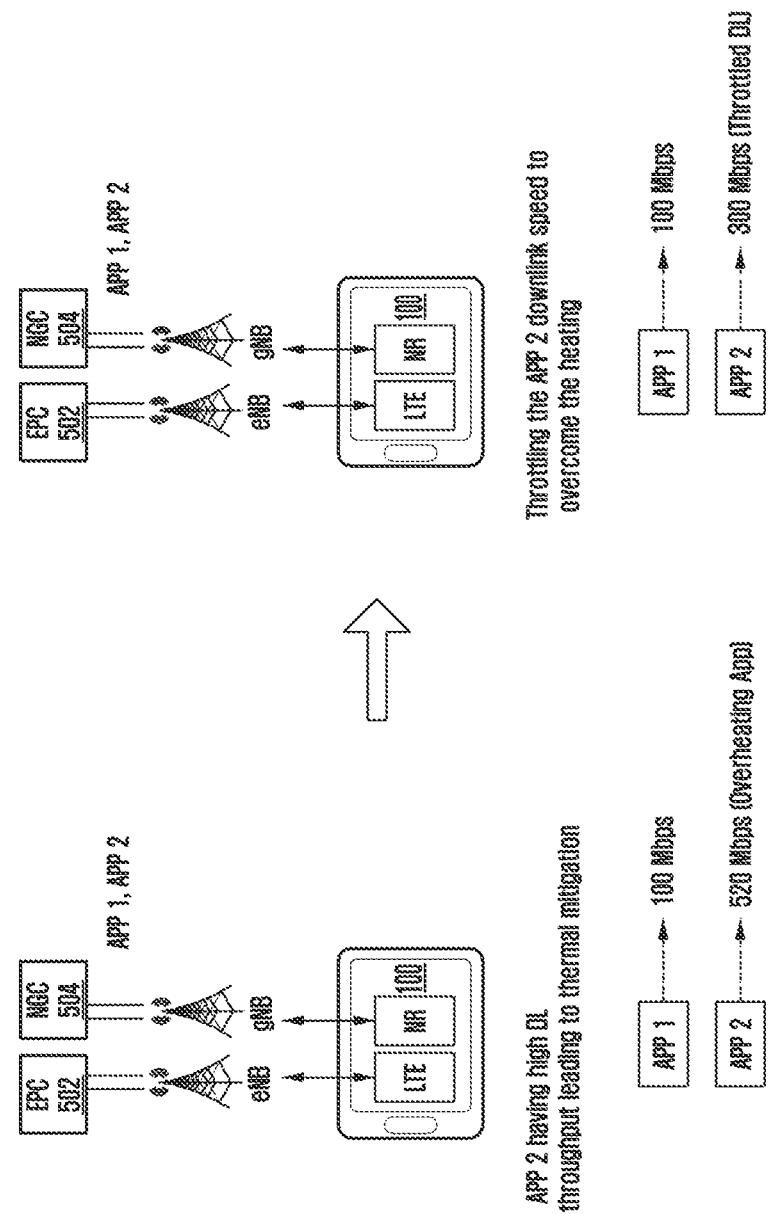
FIG. 12 illustrates an example scenario in which throttling the downlink speed of the heat causing application is depicted, when the electronic device supports a standalone mode (SA), according to an embodiment as disclosed herein.

FIG. 12 illustrates an example scenario in which throttling the downlink speed of the heat causing application is depicted, when the electronic device supports a standalone mode (SA), according to an embodiment as disclosed herein. Consider, the electronic device (100) is the SA electronic device and two PDU sessions corresponding to the two applications are running on the electronic device (100) over the NR RAT in which the application mapped to the second PDU having high DL throughput leading to thermal mitigation. Based on the proposed methods, the throughput may be reduced by throttling the downlink speed of the heat causing application. After the temperature reaches to an optimum level, throughput may be regained by undoing the same. The application can be User Datagram Protocol (UDP) or a transmission control protocol (TCP) driven.

Figure 13:
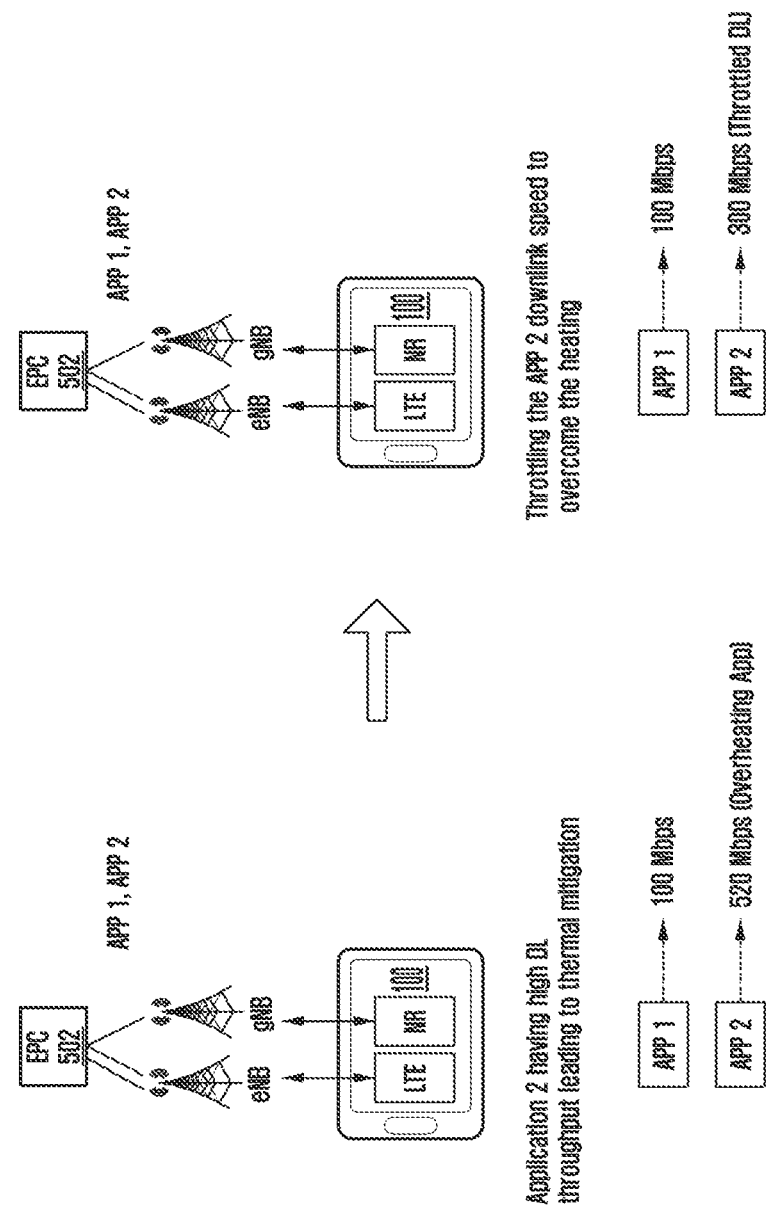
FIG. 13 illustrates an example scenario in which throttling the downlink speed of the heat causing application is depicted, when the electronic device supports an E-UTRA NR Dual connectivity (EN-DC) mode, according to an embodiment as disclosed herein.

FIG. 13 illustrates an example scenario in which throttling the downlink speed of the heat causing application is depicted, when the electronic device supports an EN-DC mode, according to an embodiment as disclosed herein. Consider, the electronic device (100) is the EN-DC electronic device and two PDU sessions corresponding to the two applications are running on the electronic device (100) over the NR RAT in which the application mapped to the second PDU having high DL throughput leading to thermal mitigation. Based on the proposed methods, the throughput may be reduced by throttling the downlink speed of the heat causing application. After the temperature reaches to an optimum level, throughput may be regained by undoing the same. The application can be the UDP or TCP driven.

Figure 14:
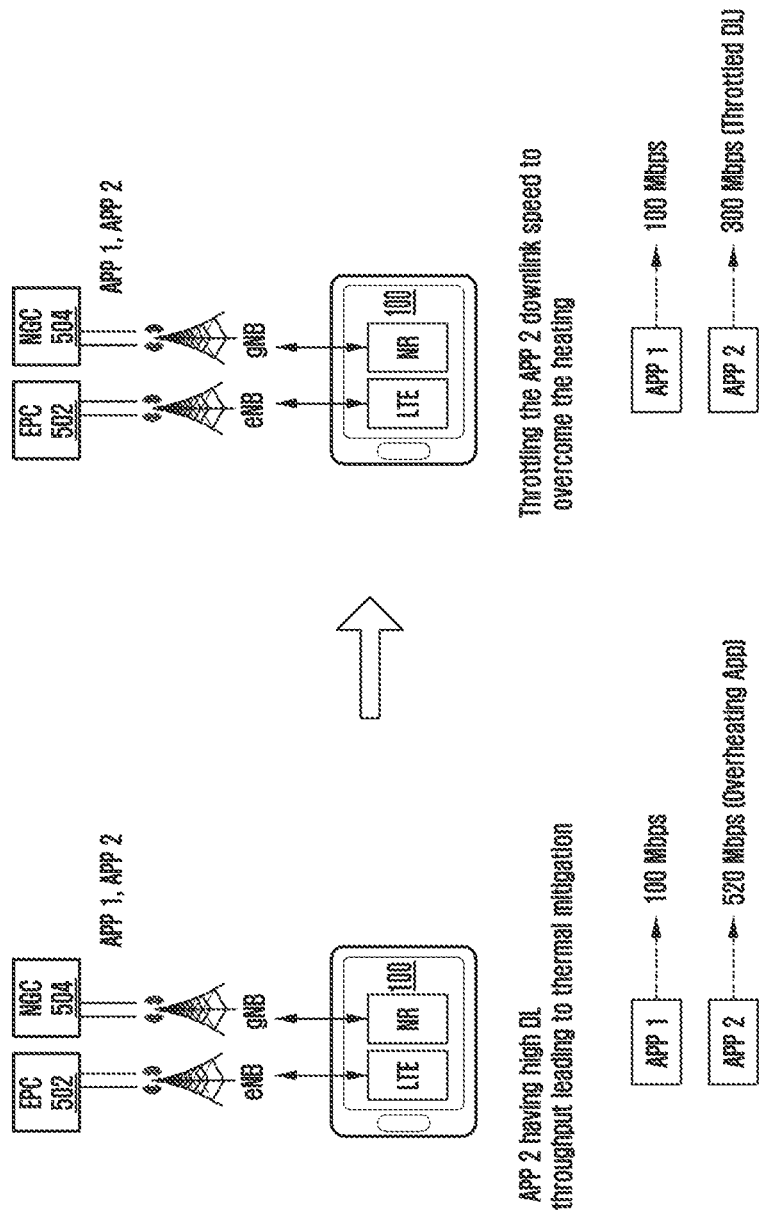
FIG. 14 illustrates an example scenario in which throttling the downlink speed of the heat causing application is depicted using a machine learning mode, when the electronic device supports a standalone mode (SA), according to an embodiment as disclosed herein.

FIG. 14 illustrates an example scenario in which throttling the downlink speed of the heat causing application is depicted using a machine learning mode, when the electronic device supports a standalone mode (SA), according to an embodiment as disclosed herein. Consider, the electronic device (100) is the SA electronic device and two PDU sessions corresponding to the two applications are running on the electronic device (100) over the NR RAT in which the application mapped to the second PDU having high DL throughput leading to thermal mitigation. Based on the proposed methods, the throughput may be reduced by throttling the downlink speed of the heat causing application by analyzing the pre-processed data related to application usage. The ML model based prediction can be done to predict the heat causing application. By using the predicted results, TP of the over-heat leading application can be throttled before it reaches the threshold.

Figure 15:
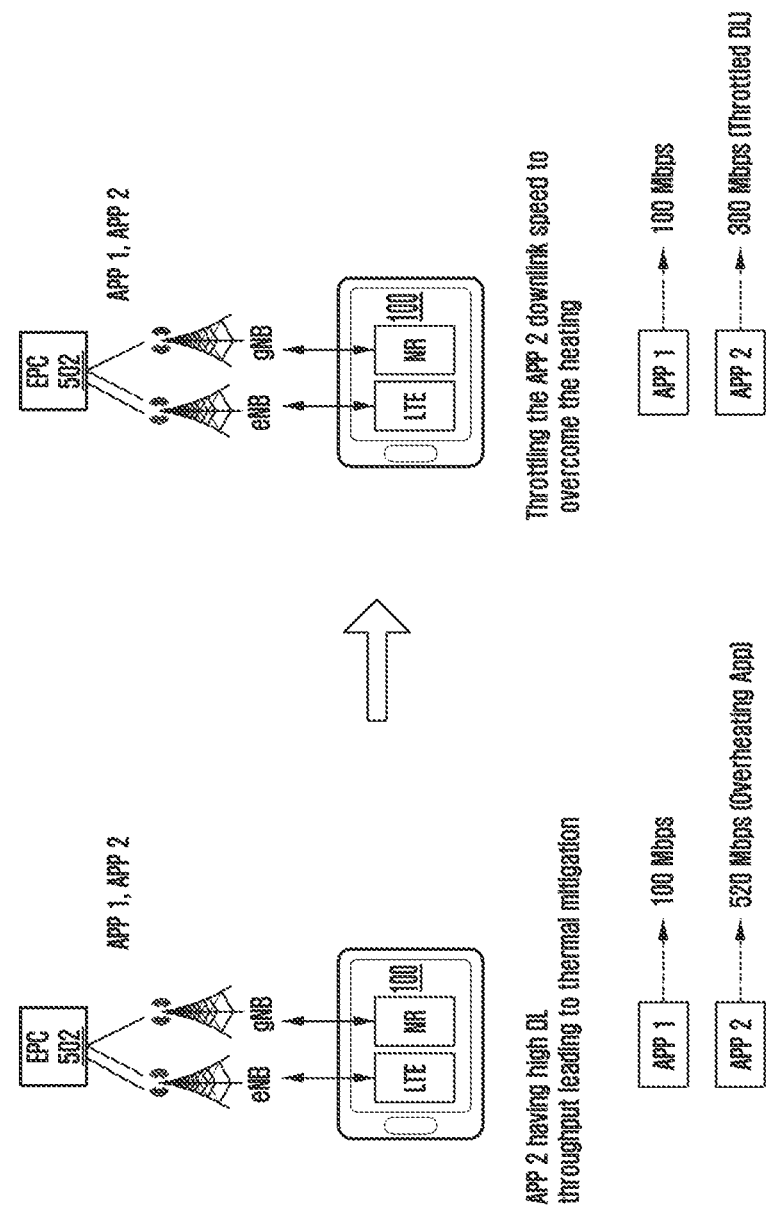
FIG. 15 illustrates an example scenario in which throttling the downlink speed of the heat causing application is depicted, when the electronic device supports an EN-DC mode, according to an embodiment as disclosed herein.

FIG. 15 illustrates an example scenario in which throttling the downlink speed of the heat causing application is depicted, when the electronic device supports an EN-DC mode, according to an embodiment as disclosed herein. Consider, the electronic device (100) is the EN-DC electronic device and two PDU sessions corresponding to the two applications are running on the electronic device (100) over the NR RAT in which the application mapped to the second PDU having high DL throughput leading to thermal mitigation. Based on the proposed methods, the throughput may be reduced by throttling the downlink speed of the heat causing application by analyzing the pre-processed data related to application usage. The ML model based prediction can be done to predict the heat causing application. By using the predicted results, TP of the over-heat leading application can be throttled before it reaches the threshold.

Figure 16:
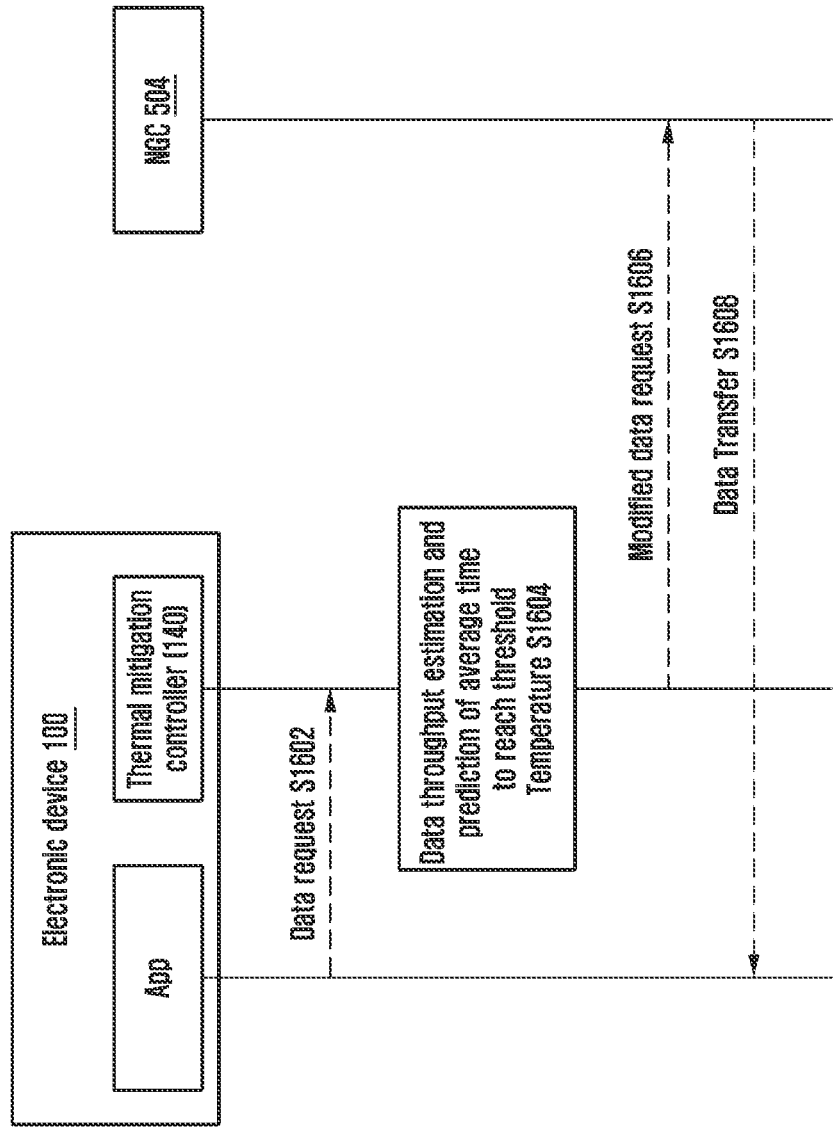
FIG. 16 illustrates an example sequence diagram in which throttling the downlink speed of the heat causing application, according to an embodiment as disclosed herein.

FIG. 16 illustrates an example sequence diagram in which throttling the downlink speed of the heat causing application is depicted, according to an embodiment as disclosed herein. At S1602, the application sends the data request to the thermal mitigation controller (140). At S1604, the thermal mitigation controller (140) performs the data throughput estimation and prediction of average time to reach threshold temperature. S1606, the thermal mitigation controller (140) sends the modified data request to the NGC (504). At S1608, the NGC (504) sends the data transfer response to the application.

Figure 17:
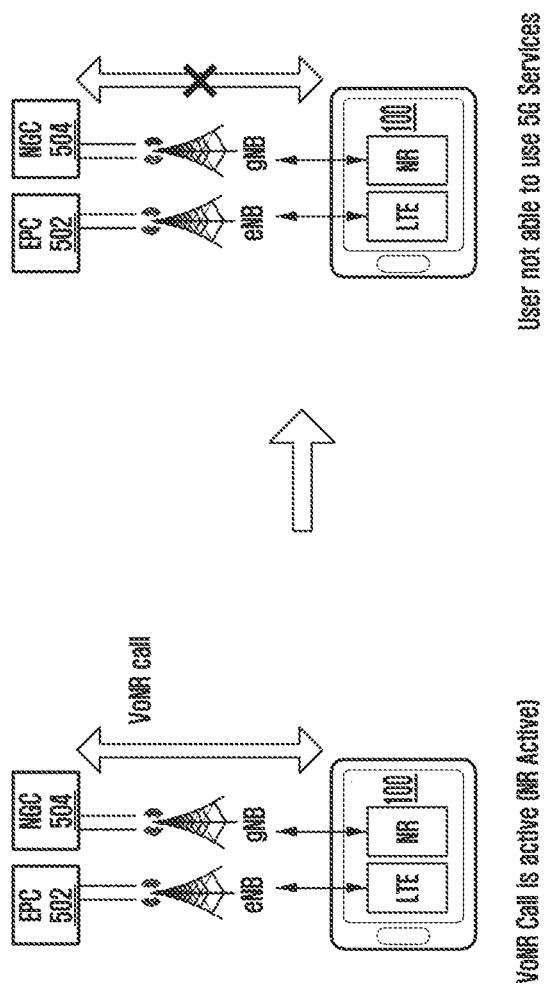
FIG. 17 illustrates an example scenario in which a VoNR call disconnected due to NR suspend, according to a prior art.

FIG. 17 illustrates an example scenario in which the VoNR call disconnected due to NR suspend is depicted, according to a prior art. Consider, the electronic device (100) determines that the VoNR call is active. The VoNR call can also lead to overheating and due to that NR suspend can happen, so that the user of the electronic device (100) will not be able to use 5G services.

Figure 18:
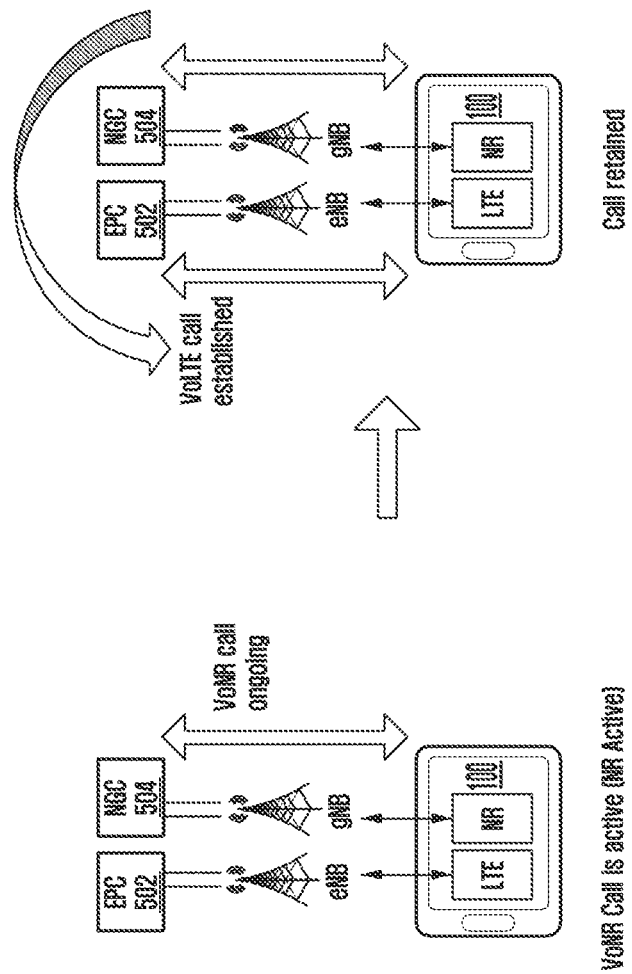
FIG. 18 illustrates an example scenario in which the VoNR call switched to a Voice over Long-Term Evolution (VoLTE) call, according to an embodiment as disclosed herein.

FIG. 18 illustrates an example scenario in which the VoNR call switched to a VoLTE call is depicted, according to an embodiment as disclosed herein. Consider, the electronic device (100) determines that the VoNR call is active. The electronic device (100) identifies the heat generation due to the VoNR call. Based on the proposed methods, the IMS bearer PDUs from the NR stack will be handover to LTE stack to reduce the NR activity. The NR activity will be reduced to lower temperature and call will be retained with proper thermal mitigation and the VoNR call is switched to VoLTE call for thermal mitigation.

Figure 19:
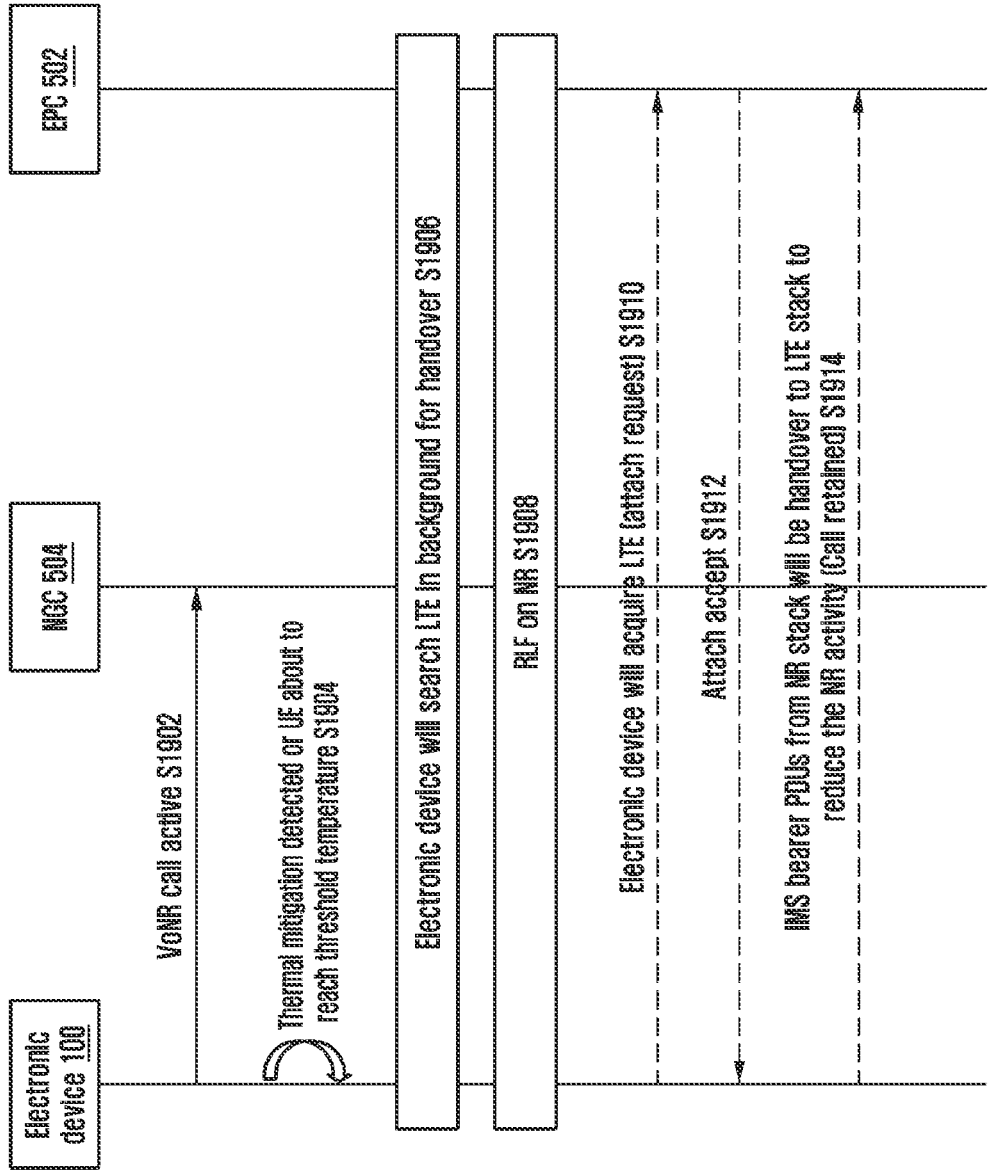
FIG. 19 illustrates an example sequence diagram in which the VoNR call switched to a VoLTE call, according to an embodiment as disclosed herein.

FIG. 19 illustrates an example sequence diagram in which the VoNR call switched to a VoLTE call is depicted, according to an embodiment as disclosed herein. At S1902, the VoNR call active is active between the electronic device (100) and the NGC (504). At S1904, the electronic device (100) determines that the thermal mitigation is detected or the electronic device (100) is about to reach threshold temperature. At S1906, the electronic device (100) searches the LTE in background for handover. At S1908, the electronic device (100) detected the RLF on the NR. S1910, the electronic device (100) will acquire the LTE by sending the attach request. At S1912, the EPC (502) sends the attach accept to the electronic device (100). S1914, the IMS bearer PDUs from NR stack will be handover to LTE stack to reduce the NR activity.

Figure 20:
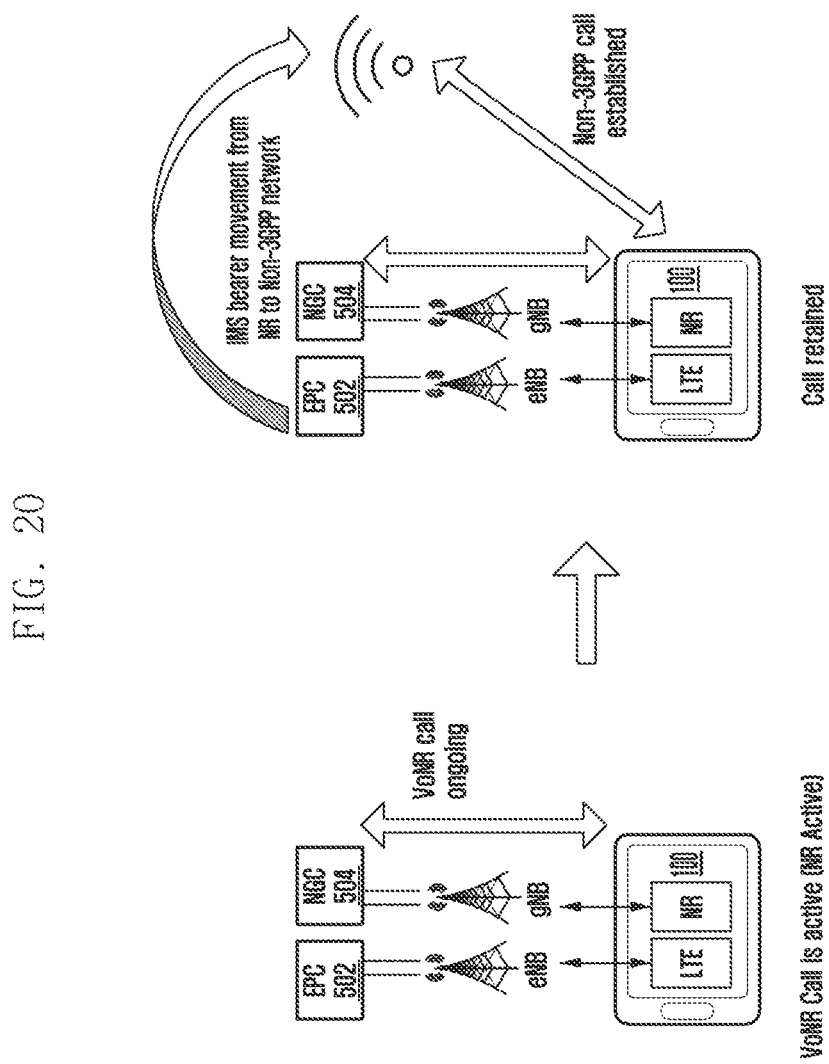
FIG. 20 illustrates an example scenario in which the VoNR call switched to a Voice over wireless fidelity (VoWi-FI) call, according to an embodiment as disclosed herein.

FIG. 20 illustrates an example scenario in which the VoNR call switched to a VoWi-FI call, according to an embodiment as disclosed herein. Consider, the electronic device (100) determines that the VoNR call is active. The electronic device (100) identifies that the heat is generated due to the VoNR call. Based on the proposed methods, the IMS bearer PDUs from NR stack will be handover to Non-3GPP network for reducing the NR activity and retaining the call. The NR activity will be reduced to lower temperature and call will be retained with proper thermal mitigation and the VoNR call is switched to VoLTE call for thermal mitigation.

Figure 21:
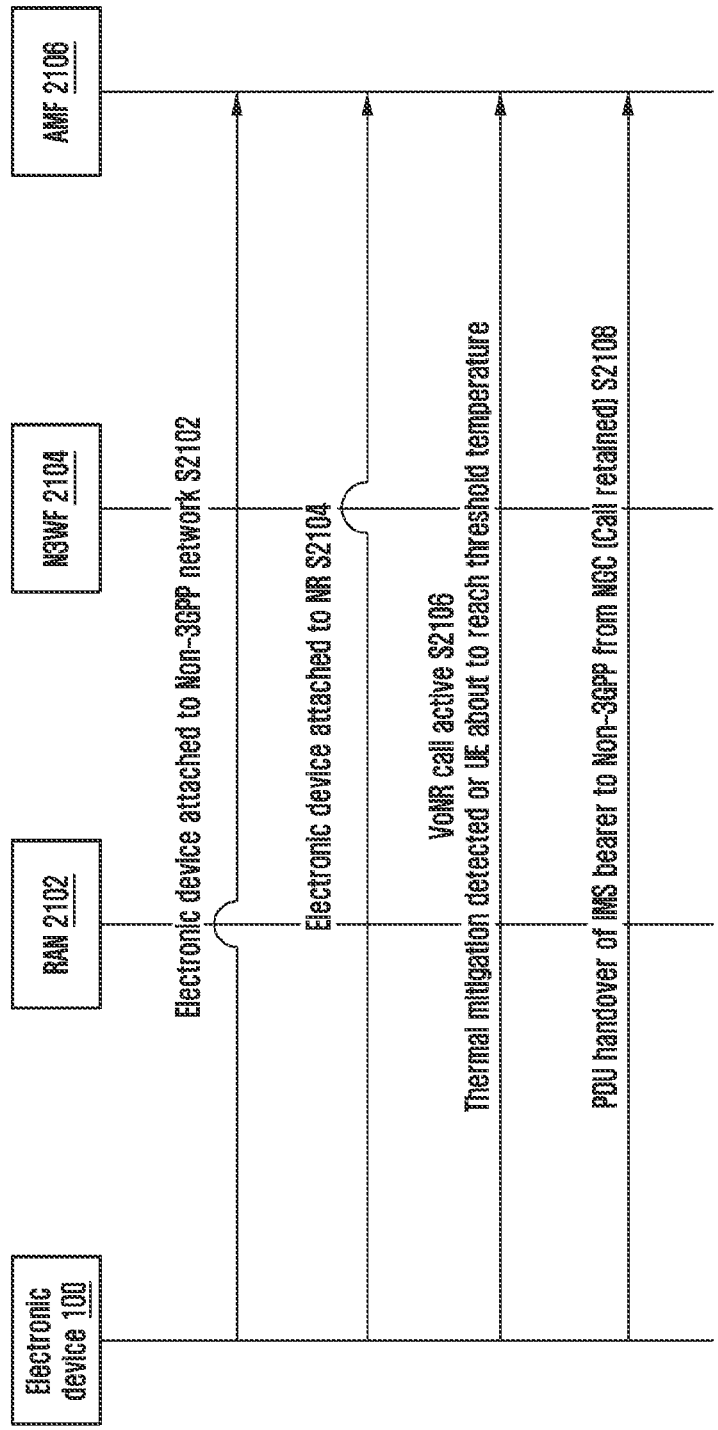
FIG. 21 illustrates an example sequence diagram in which the VoNR call switched to the VoWi-FI call, according to an embodiment as disclosed herein.

FIG. 21 illustrates an example sequence diagram in which the VoNR call switched to the VoWi-FI call is depicted, according to an embodiment as disclosed herein. At S2102, the electronic device (100) attached to a Non-3GPP network and at S2104, the electronic device (100) is attached to the NR. AT S2106, the electronic device actives the VoNR call and the electronic device (100) detects the thermal generation or the electronic device (100) is about to reach threshold temperature. At S2108, the PDU handover of IMS bearer to the Non-3GPP from the NGC (504) to retain the Call.

Figure 22:
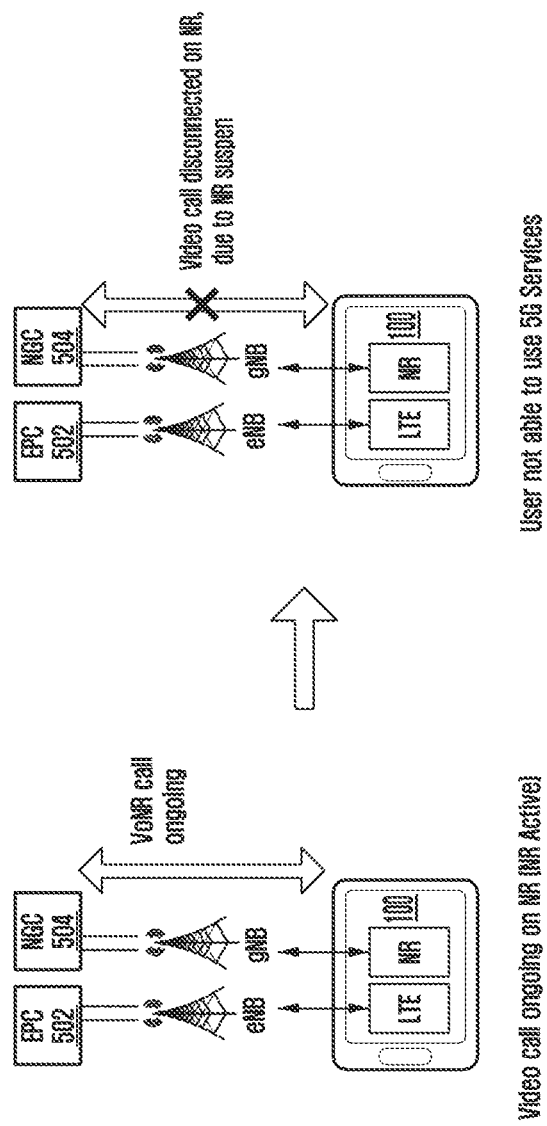
FIG. 22 illustrates an example scenario in which the Video call on NR disconnected due to NR suspend, according to a prior art.

FIG. 22 illustrates an example scenario in which the Video call on NR disconnected due to NR suspend is depicted, according to a prior art. Consider, the electronic device (100) determines that the Video call is ongoing on the NR for long duration, so that the video call can lead to overheating and due to that NR suspend can happen, so that the user of the electronic device (100) will not be able to use 5G services.

Figure 23:
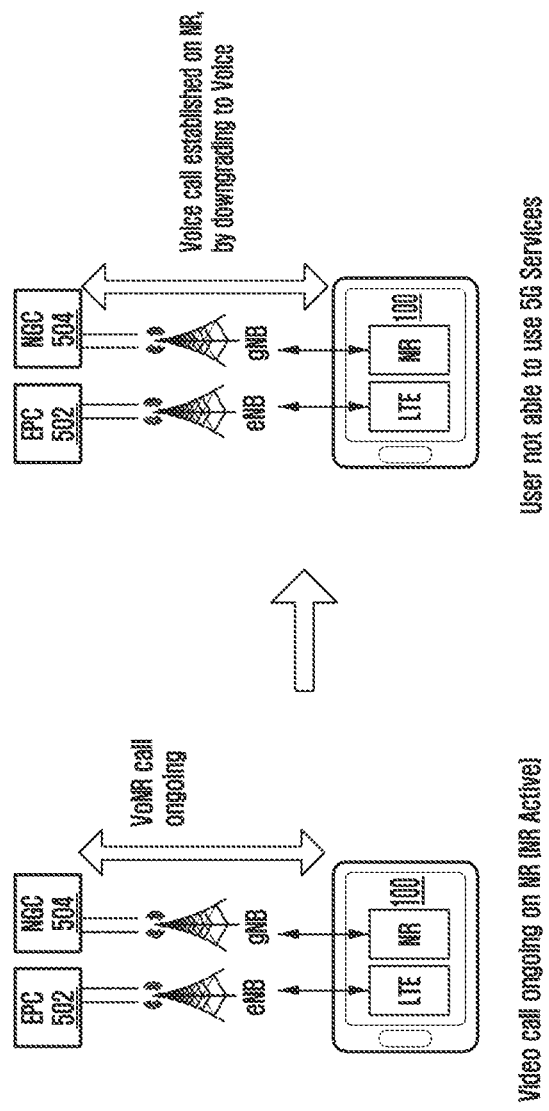
FIG. 23 illustrates an example scenario in which the downgrade from the video call to the voice call on the NR, according to an embodiment as disclosed herein.

FIG. 23 illustrates an example scenario in which the downgrade from the video call to the voice call on NR is depicted, according to an embodiment as disclosed herein. Based on the proposed methods, when the video call is active on the NR stack and temperature is increased to the threshold level, thermal mitigation will start. The video call on NR stack will be downgraded to VoNR voice call for thermal mitigation. Even after downgrading to voice call if the heating does not reduce then the VoNR will be converted to VoLTE call. With the proposed method, NR activity will be reduced to lower temperature and call will be retained with proper thermal mitigation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims

What is claimed is:

1. A method for mitigating a temperature of an electronic device, comprising:
   determining, by the electronic device, the temperature of the electronic device, during execution of a plurality of applications on the electronic device, wherein each of the applications from the plurality of applications is associated with a first radio access technology (RAT);
   detecting, by the electronic device, that the temperature of the electronic device meets thermal mitigation criteria; and
   switching, at least one application from the plurality of applications from the first RAT to a second RAT in response to detecting that the temperature of the electronic device meets the thermal mitigation criteria wherein the at least one application is selected by: determining a plurality of parameters associated with each of the applications from the plurality of applications, wherein at least one parameter from the plurality of parameters contributes to raise the temperature of the electronic device; determining a temperature contribution level of each of the applications for raising the temperature of the electronic device by applying a machine learning model on the plurality of parameters associated with each of the applications; predicting whether the temperature level of an application will contribute towards thermal overheating in response to being used for a certain duration by applying the machine learning model on the plurality of parameters associated with each of the applications; and selecting the at least one application based on the temperature level exceeding a temperature threshold.

2. The method as claimed in claim 1, wherein switching, by the electronic device, the at least one application from the plurality of applications to the second RAT from the first RAT comprises:
   sending, by the electronic device, a data connection request corresponding to the at least one application to a network entity associated with the second RAT;
   receiving, by the electronic device, a data connection response corresponding to the at least one application from the network entity associated with the second RAT based on the data connection request; and
   switching, by the electronic device, the at least one application to the second RAT from the first RAT by establishing a connection with the second RAT.

3. The method as claimed in claim 1, wherein switching, by the electronic device, the at least one application from the plurality of applications to the second RAT from the first RAT comprises:
   sending, by the electronic device, a non-access stratum message corresponding to the at least one application to a network entity associated with the second RAT, in response to the electronic device searching the network entity associated with the second RAT;
   receiving, by the electronic device, a non-access stratum message response corresponding to the at least one application from the network entity associated with the second RAT based on the sent non-access stratum message; and
   switching, by the electronic device, a data connection of the at least one application to the second RAT from the first RAT based on the non-access stratum message response.

4. An electronic device for mitigating a temperature of the electronic device, comprising:
   a memory; and
   a processor, coupled with the memory, wherein the processor is configured to:
   determine the temperature of the electronic device, during execution of a plurality of applications on the electronic device, wherein each of the applications from the plurality of applications is associated with a first radio access technology (RAT),
   detect that the temperature of the electronic device meets thermal mitigation criteria, and
   switch at least one application from the plurality of applications from the first RAT to a second RAT in response to detecting that the temperature of the electronic device meets the thermal mitigation criteria wherein the at least one application is selected by: determining a plurality of parameters associated with each of the applications from the plurality of applications, wherein at least one parameter from the plurality of parameters contributes to raise the temperature of the electronic device; determining a temperature contribution level of each of the applications for raising the temperature of the electronic device by applying a machine learning model on the plurality of parameters associated with each of the applications; predicting whether the temperature level of an application will contribute towards thermal overheating in response to being used for a certain duration by applying the machine learning model on the plurality of parameters associated with each of the applications; and selecting the at least one application based on the temperature level exceeding a temperature threshold.

5. The electronic device as claimed in claim 4, wherein the processor is further configured to control a throughput of the electronic device by throttling a speed of the at least one application which is having at least one of a high throughput and responsible for temperature increase of the electronic device in response to mitigate the temperature of the electronic device.

6. The electronic device as claimed in claim 4, wherein the first RAT is a New Radio (NR) RAT, the second RAT is a Long Term Evaluation (LTE) RAT, and the electronic device is operating in a dual registration mode.

7. The electronic device as claimed in claim 4, wherein to switch the at least one application from the plurality of applications to the second RAT from the first RAT, the processor s further configured to:
   send a data connection request corresponding to the at least one application to a network entity associated with the second RAT;
   receive a data connection response corresponding to the at least one application from the network entity associated with the second RAT based on the data connection request; and
   switch the at least one application to the second RAT from the first RAT by establishing a connection with the second RAT.

8. The electronic device as claimed in claim 4, wherein to switch the at least one application from the plurality of applications to the second RAT from the first RAT, the processor is further configured to:
   send a non-access stratum message request corresponding to the at least one application to a network entity associated with the second RAT, in response to the electronic device searching the network entity associated with the second RAT;
   receive a non-access stratum message response corresponding to the at least one application from the network entity associated with the second RAT based on the non-access stratum message; and
   switch a data connection of the at least one application to the second RAT from the first RAT based on the non-access stratum message response.

9. The electronic device as claimed in claim 4, wherein the at least one parameter is a rate-controlled socket parameter, an incoming buffer information, a numbers of Transmission Control Protocol (TCP) connection, a maximum number of concurrent connections to a server, an application throughput information, an application device heating capacity information, a radio frequency (RF) utilization information, an application priority information, an quality of service information, a TCP level scheduling information, or a processor usage associated with the at least one application.

10. The electronic device as claimed in claim 4, wherein the processor is further configured to:
    detect that the temperature of the electronic device is within the thermal mitigation criteria; and
    switch the at least one application from the plurality of applications to the first RAT from the second RAT in response to detecting that the temperature of the electronic device is within the thermal mitigation criteria.

11. The electronic device as claimed in claim 4, wherein the temperature of the electronic device is determined during one of a EUTRA NR Dual Connectivity (ENDC) mode or a standalone mode (SA) mode.

12. The electronic device as claimed in claim 4, wherein the machine learning model is trained by:
    monitoring operation of each application of the plurality of applications on the electronic device over a period of time;
    monitoring the plurality of parameters associated with each application of the plurality of applications;
    identifying the temperature contribution level of each of the applications for raising the temperature of the electronic device; and
    storing the plurality of parameters associated with each application of the plurality of applications associated with the temperature contribution level.

13. The electronic device as claimed in claim 4, wherein the machine learning model is trained by:
    monitoring a set of applications from the plurality of applications operating simultaneously on the electronic device;
    monitoring the plurality of parameters associated with the set of applications from the plurality of applications operating simultaneously on the electronic device;
    identifying the temperature contribution level of the set of applications for raising the temperature of the electronic device; and
    storing the plurality of parameters associated with the set of applications of the plurality of applications associated with the temperature contribution level.

14. The electronic device as claimed in claim 4, wherein the first RAT corresponds to a Voice over New Radio (VoNR) and the second RAT corresponds to a Voice over Long Term Evolution (VoLTE) or a Voice over wireless fidelity (VoWi-Fi).

15. The electronic device as claimed in claim 4, wherein the application is a video call application, a voice call application, a game application, a media streaming application, a fitness application, a social networking application, a multimedia application, a financial application, a chat application, or a music application.

16. The electronic device as claimed in claim 14, wherein in response to the application being a voice call application or a video call application and the voice call or the video call being in the VoNR, switching the voice call application or the video call application to the VoWi-Fi from the VoNR comprises:
    sending a data connection request corresponding to the voice call application or the video call application to a network entity associated with the VoWi-Fi;
    receiving a data connection response corresponding to the voice call application or the video call application from the network entity associated with the VoWi-Fi based on the data connection request; and
    switching the voice call application or the video call application to the VoWi-Fi from the VoNR by establishing a connection with the VoWi-Fi.

17. The electronic device as claimed in claim 14, wherein in response to the application being a voice call application or a video call application and the voice call or the video call being in the VoNR, switching, by the electronic device, the voice call application or the video call application to the VoLTE from the VoNR comprises:
    sending a non-access stratum message corresponding to the voice call application or the video call application to a network entity associated with the VoLTE, in response to the electronic device searching the network entity associated with the VoLTE;
    receiving a non-access stratum message response corresponding to the voice call application or the video call application from the network entity associated with the VoLTE based on the non-access stratum message; and switching a data connection of the voice call application or the video call application to the VoLTE from the VoNR based on the non-access stratum message response.

18. The electronic device as claimed in claim 14, wherein in response to the application being a video call application and the video call being in the VoNR, switch the video call application to a voice call application in the in the VoNR comprises:
- detect a temperature contribution level of the video call application for raising the temperature of the electronic device; and
- switch the video call application to the voice call application in the VoNR based on the detection.

* * * * *